United States Patent
Douta et al.

[19]

[11] Patent Number: 6,073,440

[45] Date of Patent: Jun. 13, 2000

[54] SYSTEM FOR DETECTING DETERIORATION OF CATALYST FOR PURIFYING EXHAUST GAS

[75] Inventors: Hisayo Douta, Chiryu; Masaaki Nakayama, Toyoake; Yasuo Mukai, Kariya, all of Japan

[73] Assignee: Denso Corporation, Japan

[21] Appl. No.: 08/828,181

[22] Filed: Mar. 18, 1997

[30] Foreign Application Priority Data

Mar. 19, 1996 [JP] Japan .................................... 8-062217
Feb. 7, 1997 [JP] Japan .................................... 9-024697

[51] Int. Cl.$^7$ ........................................................ F01N 3/00
[52] U.S. Cl. ............................ 60/277; 60/276; 60/284
[58] Field of Search ............................ 60/274, 276, 277, 60/284; 73/118.1

[56] References Cited

U.S. PATENT DOCUMENTS

| | | |
|---|---|---|
| 5,154,055 | 10/1992 | Nakane et al. . |
| 5,279,116 | 1/1994 | Shimizu et al. . |
| 5,301,501 | 4/1994 | Shimizu et al. . |
| 5,303,548 | 4/1994 | Shimizu et al. . |
| 5,606,855 | 3/1997 | Tomisawa ................................. 60/277 |
| 5,675,967 | 10/1997 | Ries-Muller ............................... 60/277 |
| 5,727,383 | 3/1998 | Yamashita et al. ........................ 60/277 |
| 5,787,705 | 8/1998 | Thoreson .................................. 60/274 |
| 5,832,724 | 11/1998 | Watanabe et al. ......................... 60/277 |
| 5,851,376 | 12/1998 | Noshioka et al. ......................... 60/276 |

FOREIGN PATENT DOCUMENTS 2-136538  5/1990  Japan .
6-508414  9/1994  Japan .

*Primary Examiner*—Thomas E. Denion
*Attorney, Agent, or Firm*—Nixon & Vanderhye PC

[57] ABSTRACT

In a system for detecting deterioration of an exhaust catalyst, when a catalyst temperature exceeds 150° C., the changing widths of the output voltage of an oxygen sensor downstream of the catalyst are integrated for a predetermined sampling period to determine data ΣV reflecting the amount of purified gas component, and the deviation of the air/fuel ratio detected by an air/fuel ratio sensor upstream of the catalyst, and a target A/F and an exhaust gas flow rate or an intake flow rate are multiplied so that data ΣA/F •Q of the fluctuation of the gas component flowing into the catalyst are determined by integrating the multiplied values. At the instant when the catalyst temperature reaches 550° C., the data ΣV, as integrated till then, are compared with a deterioration determining value, as set according to the data ΣA/F•Q, to determine whether the catalyst is deteriorated.

23 Claims, 18 Drawing Sheets

FIG. 4

| Q(ℓ/s) \ Ne(rpm) | 700 | 1500 | 2300 |
|---|---|---|---|
| 4 | 375 | · | · |
| 20 | 530 | · | · |

FIG. 5

| TCAT | 100 | 300 | 500 |
|---|---|---|---|
| TEX(°C) | 50 | 200 | 400 |

FIG. 6

| Q (ℓ/s) | 8 | 16 | 24 |
|---|---|---|---|
| K1 | 0.002 | 0.010 | 0.020 |
| K2 | 0.003 | 0.020 | 0.025 |

| $\Sigma\Delta A/F \cdot Q$ | 1000 | 1200 | 1400 | |
|---|---|---|---|---|
| DET. REF. | 20 | 24 | 28 | |

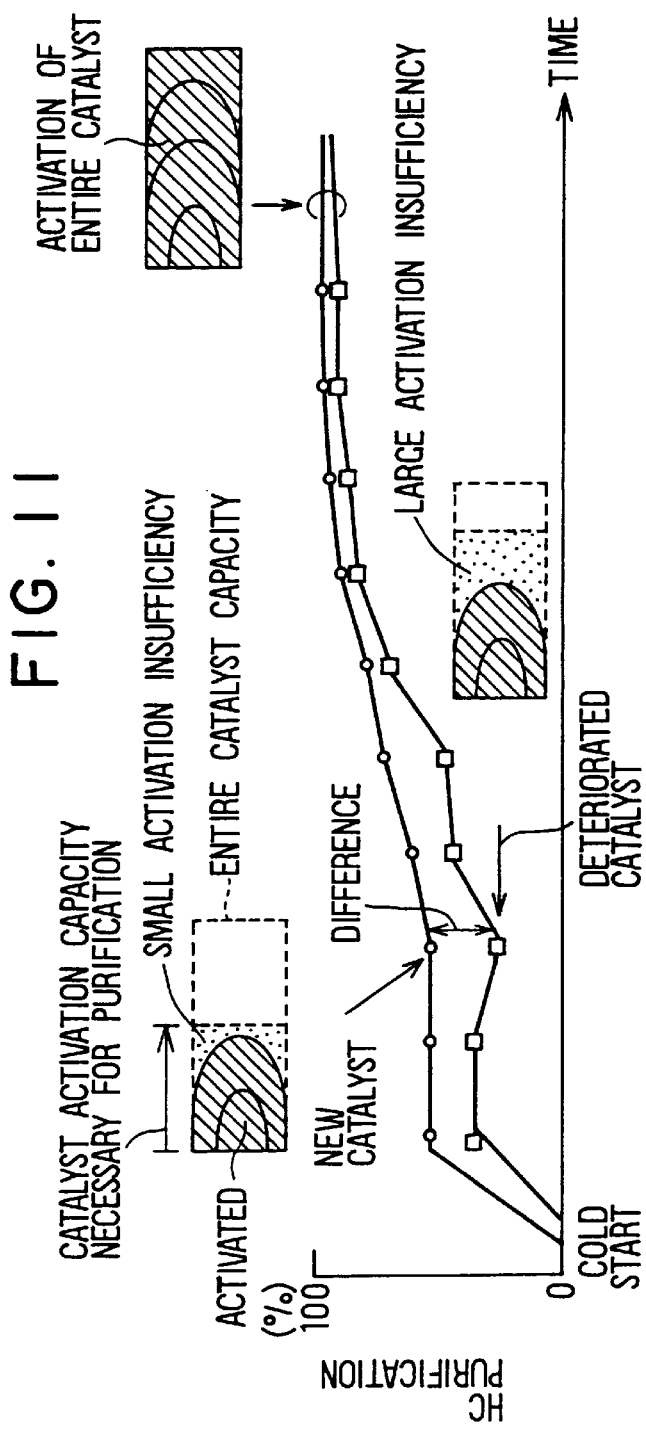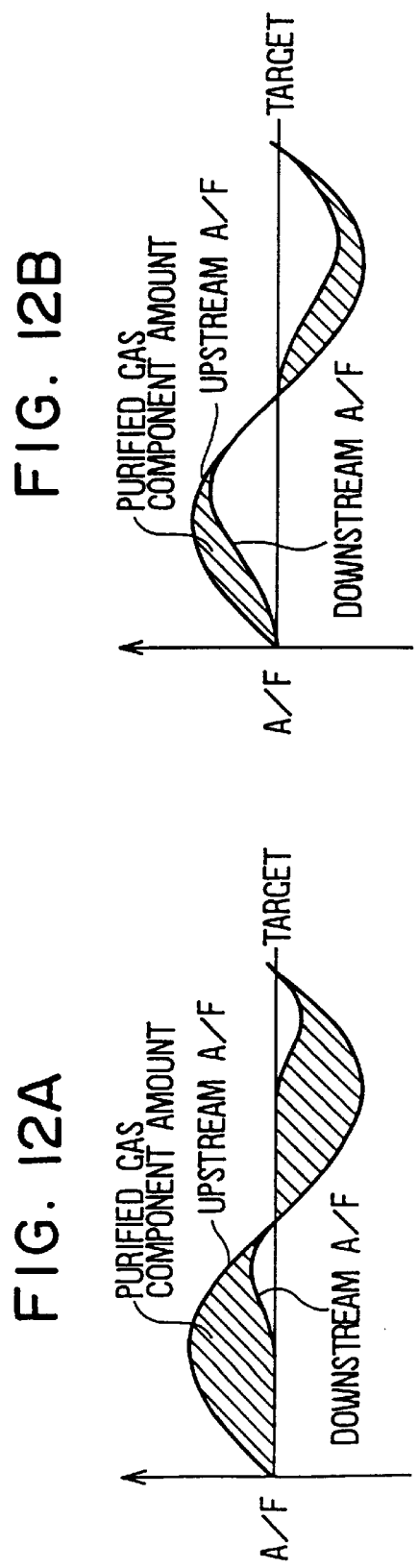

SYSTEM FOR DETECTING DETERIORATION OF CATALYST FOR PURIFYING EXHAUST GAS

BACKGROUND OF THE INVENTION

1. Field of the Invention

The present invention relates to an exhaust gas purifying catalyst deterioration detecting system for detecting the deterioration, if any, of a catalyst which is disposed in the exhaust system of an internal combustion engine for purifying the engine exhaust gas.

2. Related Art

In order to prevent a vehicular exhaust gas purifying system from run with the catalyst being deteriorated so as to have a lower exhaust gas purifying ability, a catalyst deterioration detecting system has been developed for detecting the deterioration of the catalyst (as disclosed in Japanese Patent Laid-Open Publication No. 2-136538 or 3-253714, for example). These the catalyst deterioration detecting systems are made to detect the deterioration of the catalyst from a reduction in the exhaust gas purifying ability after the catalyst is warmed up to an activation temperature (generally 300 to 400° C. or higher).

Before the catalyst is warmed up to the activation temperature after an engine start, even the normal catalyst has a low exhaust gas purifying ability; however the deteriorated catalyst has a much lower exhaust gas purifying ability, and thus increases to increase noxious contents (or emissions) in the exhaust gas. According to both of the aforementioned catalyst deterioration detecting methods of the prior art, however, the deterioration of the catalyst is detected from the drop in the exhaust gas purifying ability after the activation of the catalyst, thereby making the catalyst deterioration detection difficult while considering the emission increasing degree before the catalyst activation. The increase in the emissions before the catalyst activation may erroneously determine that the catalyst which is to be intrinsically determined deteriorated is not deteriorated.

If the engine is started cold, the activation of the catalyst proceeds from the inflow (or upstream) side of the exhaust gas as the time elapses after the cold-start, until the entire catalyst is finally activated. Generally, the catalyst is given some surplus in its entire capacity so that it can achieve, even if deteriorated more or less once entirely activated, a purification factor approximate to that of a new one thereby to reduce the difference in the purification factor between the deteriorated and new catalysts. As the activation of the catalyst proceeds the better, it becomes more difficult to discriminate between (i.e., to detect the catalyst deterioration) the deteriorated and new catalysts. As a result, when the deterioration of the catalyst is detected from the drop in the exhaust gas purifying ability after the catalyst activation, the emission increase before the catalyst activation may determine no deterioration of the catalyst, which should be intrinsically determined to be deteriorated.

SUMMARY OF THE INVENTION

The present invention has been conceived by considering such background and has an object to provide an exhaust gas purifying catalyst deterioration detecting system which can perform a catalyst deterioration detection while considering the emission increase before the catalyst activation thereby to improve the catalyst deterioration detecting accuracy.

In order to achieve this object, according to a first aspect of the present invention, noting that the amount of gas component to be purified in the catalyst (as will be called the "amount of purified gas component") changes with the deterioration degree of the catalyst, the amount of purified gas component till the catalyst reaches a predetermined temperature is after a start of an internal combustion engine is calculated, so that the deterioration of the catalyst is detected on the basis of the amount of purified gas component. As a result, it is possible to detect the catalyst deterioration highly accurately while considering the emission increase before the catalyst activation.

Preferably, at the time of detecting the deterioration of the catalyst, consideration is taken into not only the amount of purified gas component but also the data of the fluctuation of the gas component flowing into the catalyst till the catalyst reaches a predetermined temperature. This is because the amount of purified gas component is influenced by the fluctuation of the gas component flowing into the catalyst, so that a highly accurate catalyst deterioration detection excluding the influences of the fluctuation of the gas component flowing into the catalyst can be achieved by performing the catalyst deterioration detection while considering the fluctuation of the gas component flowing into the catalyst.

Preferably, the amount of purified gas component is calculated on the basis of the air/fuel ratio of the exhaust gas downstream of the catalyst. This is because the air/fuel ratio of the exhaust gas downstream of the catalyst is a parameter reflecting the amount of purified gas component.

Preferably, the data of the fluctuation of the gas component flowing into the catalyst is accurately determined by calculating the data of the fluctuation of the gas component is flowing into the catalyst on the basis of the air/fuel ratio of the exhaust gas flowing into the catalyst and the flow rate of the exhaust gas.

Preferably, the catalyst deterioration detection is inhibited till the catalyst temperature reaches a deterioration detection starting temperature lower than the aforementioned predetermined level. With the catalyst temperature failing to reach the deterioration detection starting temperature, specifically, the temperature of the sensor for detecting the air/fuel ratio downstream of the catalyst is so low that the sensor output is not stabilized. As a result, the catalyst deterioration detecting accuracy is prevented from dropping by inhibiting the catalyst deterioration detection for that period.

Preferably, the catalyst deterioration detection is inhibited when the catalyst temperature at the start of the internal combustion engine is higher than a predetermined level. According to this catalyst deterioration detecting method, the catalyst deterioration is detected from the amount of purified gas component in the course (e.g., the catalyst temperature ranging from 150 to 550° C.) of the activation of the catalyst. As a result, when the catalyst temperature at the engine start far exceeds the lower level of 150° C., for example, the amount of purified gas component will deviate to lower the detection accuracy of the catalyst deterioration. Therefore, the accuracy drop of the catalyst deterioration detection is prevented by inhibiting the catalyst deterioration is detection when the catalyst temperature at the engine start is higher than the predetermined level.

Preferably, noting that the catalyst is warmed up with the exhaust heat, the exhaust temperature is estimated on the basis of the running state of the engine so that the catalyst temperature is estimated on the basis of the exhaust temperature. As a result, the temperature sensor for detecting the catalyst temperature can be eliminated to meet the demand for reducing the cost for parts.

Preferably, the catalyst deterioration detection is inhibited till a predetermined period is elapsed after the start of the air/fuel ratio feedback control. Thus, the catalyst deterioration detection can be started after stabilization of the air/fuel ratio feedback, to improve the catalyst deterioration detecting accuracy better. Here, the "Predetermined period" for inhibiting the catalyst deterioration detection is one necessary for the air/fuel ratio feedback to be stabled after the start of the air/fuel ratio feedback control. This period may be exemplified either by the period which is elapsed after the start of the air/fuel ratio feedback control or by the period for which the output of the air/fuel ratio sensor to cross the threshold value at first after the start of the air/fuel ratio feedback control.

According to a second aspect of the present invention, in a system including an air/fuel ratio sensor and an oxygen sensor upstream and downstream of the catalyst for purifying the exhaust gas, the saturation (which means that the output of the downstream oxygen sensor goes out of the stoichiometric ratio) of the catalyst is determined on the basis of the output of the downstream oxygen sensor, and the area of the portion, as enclosed by the output waveform of the upstream air/fuel ratio sensor and a target air/fuel ratio, is calculated to determine the amount of gas component flowing into the catalyst. At the same time, the output changes of the downstream oxygen sensor are integrated by second calculation means to determine the amount of gas component flowing out of the catalyst. At the instant, moreover, when the catalyst saturation is determined, the amount of gas component flowing out of the catalyst is corrected on the basis of the output of the upstream air/fuel ratio sensor so that the deterioration of the catalyst is detected on the basis of the corrected amount of gas component flowing out of the catalyst and the amount of gas component flowing into the catalyst.

Here, the output voltage of the downstream oxygen sensor changes linearly with an excess air ratio λ (or air/fuel ratio) in the vicinity of the stoichiometric ratio but does not change so much in a region apart from the stoichiometric ratio even if the excess air ratio λ changes, so that the amount of gas component flowing out of the catalyst cannot be accurately detected. Hence, the region apart from the stoichiometric ratio is deemed as the catalyst saturation. In this catalyst saturation state, the ratio of being purified in the catalyst is low, and the amount of gas component flowing out of the catalyst has a correlation to the amount of gas component flowing into the catalyst. Therefore, if the amount of gas component flowing out of the catalyst is corrected, when the catalyst saturation is determined, on the basis of the output of the upstream air/fuel ratio sensor, the amount of gas component flowing out of the catalyst can be highly accurately determined, even in the catalyst saturation state, to improve the catalyst deterioration detecting accuracy far better.

According to a third aspect of the present invention, moreover, in a system including an air/fuel ratio sensor and an oxygen sensor disposed upstream and downstream of the exhaust gas purifying catalyst, the changing widths of the output voltage of the downstream oxygen sensor are integrated to provide the data reflecting the amount of purified gas component for a predetermined sampling period. For this predetermined sampling period, moreover, the deviation of the air/fuel ratio, as detected by the upstream air/fuel ratio sensor, from a target air/fuel ratio and the exhaust gas flow rate are multiplied, and these multiplied values are integrated to provide the data of the fluctuation of the gas component flowing into the catalyst. Then, the deterioration of the catalyst is detected on the basis of the first integrated value and the second integrated value till the catalyst reaches to a predetermined temperature. This makes it possible to perform the highly accurate catalyst deterioration detection while excluding the influences of the fluctuation of the gas component flowing into the catalyst.

According to a fourth aspect of the present invention, moreover, in a system including air/fuel ratio sensors disposed both upstream and downstream of the exhaust gas purifying catalyst, the deviation of the upstream air/fuel ratio, as detected by the upstream air/fuel ratio sensor for a predetermined sampling period, from a target air/fuel ratio and the exhaust gas flow rate are multiplied, and these multiplied values are integrated to provide the data of the fluctuation of the gas component flowing into the catalyst. Moreover, the deviation of the downstream air/fuel ratio, as detected by the downstream air/fuel ratio sensor for the predetermined sampling period, and the exhaust gas flow rate are multiplied, and these multiplied values are integrated to provide the data of the fluctuation of the gas component flowing out of the catalyst. Then, the first integrated value or the data of the fluctuation of the gas component flowing into the catalyst by and the second integrated value or the data of the fluctuation of the gas component flowing out of the catalyst by the second integration means till the catalyst reaches the predetermined temperature are compared to calculate the amount of purified gas component so that the catalyst deterioration is detected on the basis of the amount of purified gas component. As a result, it is possible to perform the highly accurate catalyst deterioration detection while considering the fluctuation of the gas component flowing into the catalyst and the fluctuation of the gas component flowing out of the catalyst.

BRIEF DESCRIPTION OF THE DRAWINGS

FIG. 4 is a diagram schematically showing a map for estimating an exhaust temperature TEX from an engine revolution number Ne and an intake flow rate Q;

FIG. 5 is a diagram showing a data table for specifying a relation between a catalyst temperature TCAT and the exhaust temperature TEX at the beginning of a fuel cut;

FIG. 6 is a diagram showing a data table for specifying a relation between the intake flow rate and coefficients K1 and K2;

FIG. 11 is a diagram showing one example of the aging changes in an HC purification factor of new and deteriorated catalysts after a cold start;

FIGS. 12A and 12B are diagrams for explaining a catalyst deterioration detecting method in a second embodiment of the present invention;

DETAILED DESCRIPTION OF PREFERRED EMBODIMENTS

First Embodiment

Figure 1:
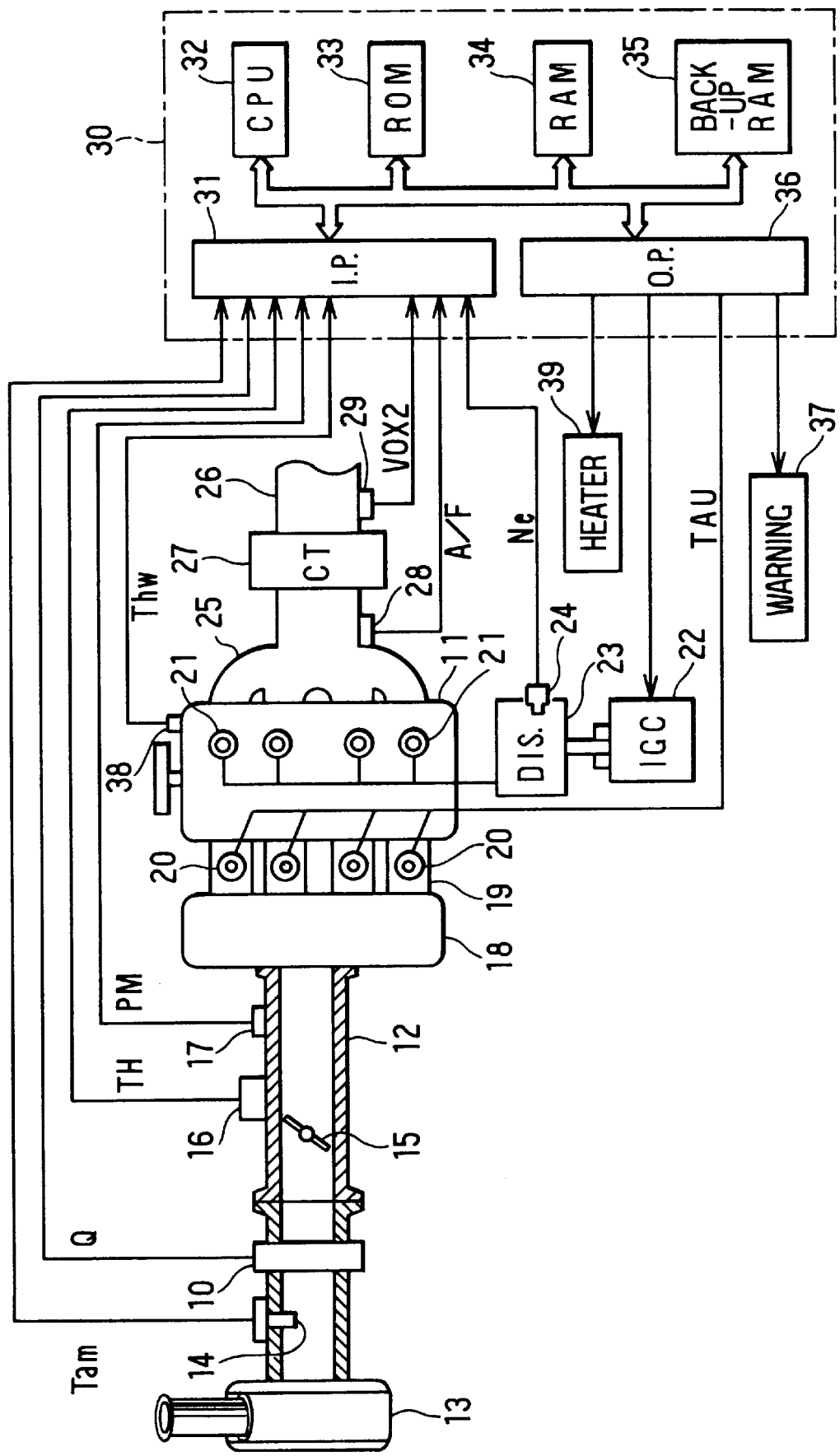
FIG. 1 is a schematic diagram showing the entire construction of an engine control system in a first embodiment of the present invention.

The first embodiment of the present invention will be described with reference to FIGS. 1 to 10. First of all, the schematic construction of the entirety of an engine control system will be described with reference to FIG. 1. In the most upstream portion of an intake pipe 12 of an engine 11 of internal combustion type, there is disposed an air cleaner 13, downstream of which are an intake temperature sensor 14 for detecting an intake temperature Tam and an air flow meter 10 for detecting an intake air flow rate Q. Downstream of this air flow meter 10, there are disposed a throttle valve 15 and a throttle opening sensor 16 for detecting a throttle opening angle TH. Downstream of the throttle valve 15, moreover, there is disposed an intake pipe pressure sensor 17 for detecting an intake pipe pressure PM, downstream of which is disposed a surge tank 18. To this surge tank 18, there is connected an intake manifold 19 for introducing the air into the individual cylinders of the engine 11. To the individual branches of the intake manifold 19, there are attached injectors 20 for injecting the fuel thereinto.

To the individual cylinders of the engine 11, on the other hand, there are attached ignition plugs 21 which are fed through a distributor 23 with a high voltage, as established by an ignition circuit (IGC) 22. This distributor 23 is equipped with a crank angle sensor 24 for outputting twenty four pulse signals, for example, at every 720 degrees CA (i.e., every two revolutions of the crankshaft). To the engine 11, moreover, there is attached a water temperature sensor 38 for detecting an engine cooling water temperature Thw.

To the (not-shown) exhaust port of the engine 11, on the other hand, there is connected through an exhaust manifold an exhaust pipe 26 which is equipped in its midway with a catalyst (CT) 27 of ternary or three-way type for reducing the noxious content (e.g., CO, HC or NOx) in the exhaust gas. Upstream of this catalyst 27, there is disposed an upstream air/fuel ratio sensor 28 for outputting a linear air/fuel ratio signal according to the air/fuel ration A/F of the exhaust gas. In this upstream air/fuel ratio sensor 28, there is mounted a (not-shown) heater for promoting the activation thereof. Downstream of the catalyst 27, on the other hand, there is disposed a downstream oxygen sensor 29 for outputting an output voltage VOX2 which is inverted depending upon whether the air/fuel ration A/F of the exhaust gas is rich or lean with respect to the stoichiometric air/fuel ratio. In this downstream oxygen sensor 29, there is mounted a heater 39 for promoting the activation of the oxygen sensor 29.

The outputs of the various sensors thus far described are fetched by an electronic control unit 30 through an input port 31. This electronic control unit 30 is constructed mainly of a microcomputer which is equipped with a CPU 32, a ROM 33, a RAM 34 and a backup RAM 35. The electronic control unit 30 thus constructed controls the engine 11 by calculating a fuel injection rate TAU, an ignition timing Ig and so on with the engine running state parameters, as obtained from the various sensor outputs, and by outputting signals according to the calculation results from an output port 36 to the injector 20 and the ignition circuit 22.

Figure 2:
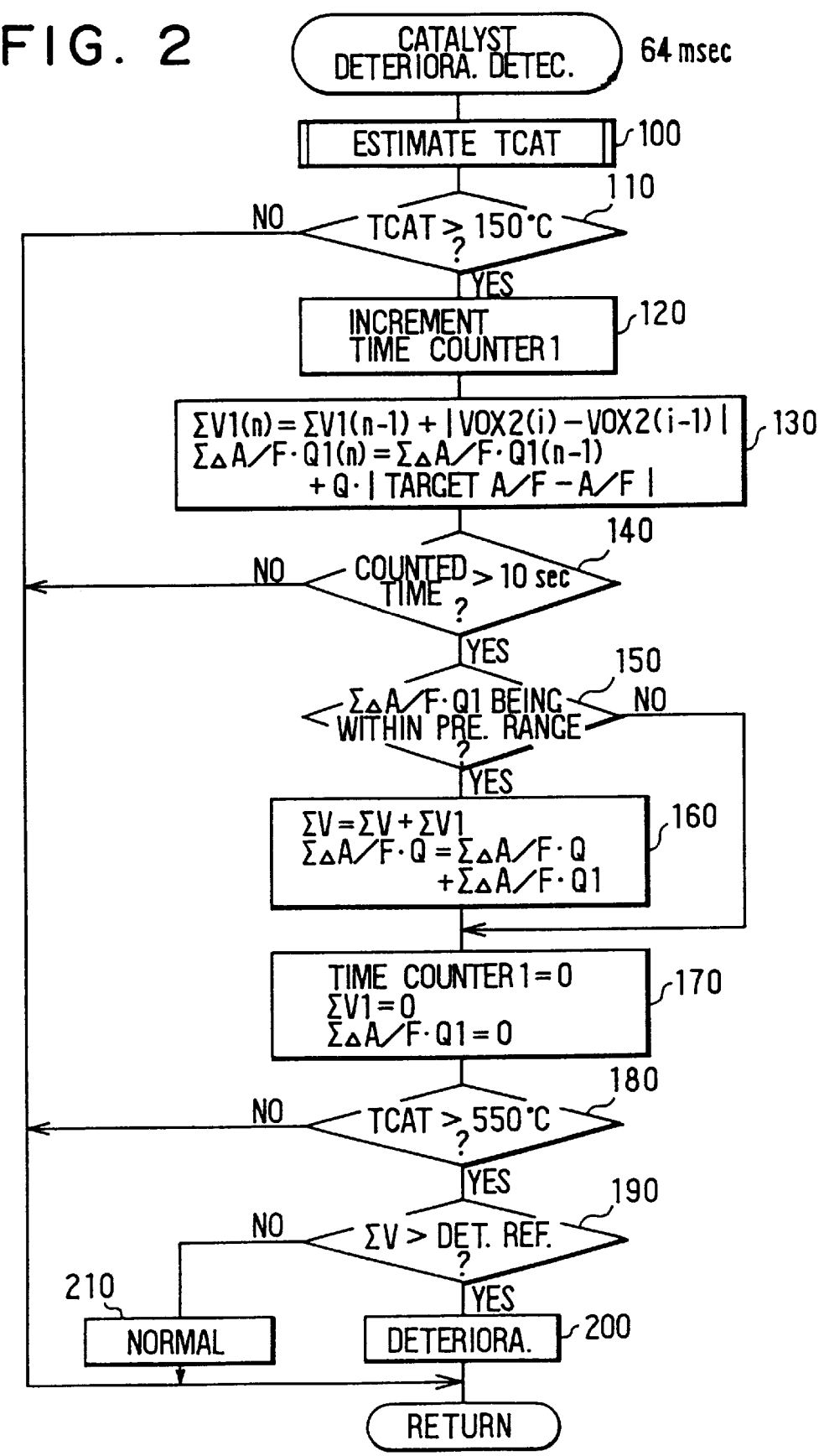
FIG. 2 is a flow chart showing a processing flow of a catalyst deterioration detecting routine.
Figure 3:
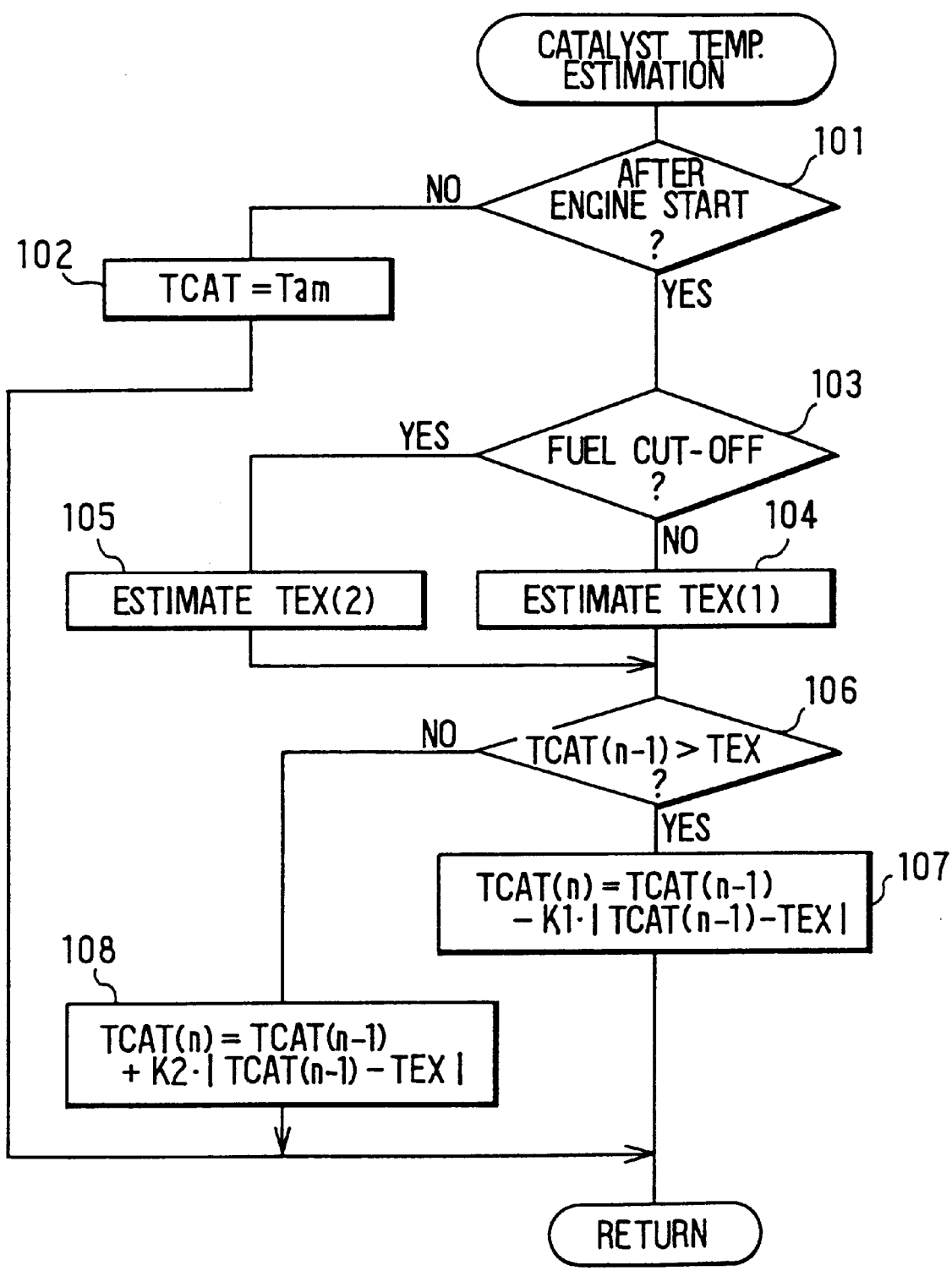
FIG. 3 is a flow chart showing a processing flow of a catalyst temperature estimating routine.

On the other hand, this electronic control unit 30 stores in its ROM 33 (or storage medium) the later-described catalyst deterioration detecting routine, as shown in FIG. 2, and the catalyst temperature estimating routine, as shown in FIG. 3. The electronic control unit 30 functions, when it executes those routines, as calculation means for calculating the amount of gas component (or a purified gas component) to be purified in the catalyst 27 and as catalyst deterioration detecting means for detecting the deterioration of the catalyst 27. Moreover, the electronic control unit 30 outputs, when it detects the deterioration of the catalyst 27, a lighting signal from the output port 36 to a warning lamp 37 to warn the driver.

Here will be described a processing flow of the catalyst deterioration detecting routine with reference to FIG. 2. The present routine functions as the catalyst temperature estimating means and is executed by an interrupt processing at every predetermined time intervals (e.g., every 64 msecs.). When the processing of the present routine is started, at first Step 100, the catalyst temperature estimating routine shown in FIG. 3 is executed to estimate an catalyst temperature TCAT in the following manner.

In the catalyst temperature estimating routine shown in FIG. 3, at first Step 101, it is determined whether or not the engine 11 is started. If before the engine start, it is set at Step 102 that the catalyst temperature TCAT=the intake temperature Tam (=the ambient temperature), and the present routine is ended.

If the engine 11 is started, on the other hand, the routine proceeds to Step 103, at which it is determined whether or not the fuel is being cut. If this answer is "No", the routine proceeds to Step 104, at which an exhaust temperature TEX is estimated in the following manner. The ROM 33 is stores in advance the mapped data, as shown in FIG. 4, for estimating the exhaust temperature TEX from an engine rotation speed Ne (i.e., RPM) and an intake air flow rate Q (=an exhaust gas flow rate), so that the exhaust temperature TEX is estimated at Step 104 from the map of FIG. 4 in accordance with the engine RPM Ne and the intake flow rate Q at that instant. This estimation method utilizes the characteristics in which the exhaust temperature TEX grows the higher for the heavier engine load (Ne, Q).

While the fuel is being cut, on the other hand, the combustion heat of the fuel disappears to lower the exhaust temperature TEX abruptly so that the exhaust temperature TEX cannot be estimated from the engine RPM Ne and the intake flow rate Q. If the fuel cut is determined at Step 103, therefore, the routine proceeds to Step 105, at which the exhaust temperature TEX is estimated from the estimated catalyst temperature TCAT at the beginning of the fuel cut by using the map which is shown in FIG. 5 and stored in the ROM 33. This estimation method utilizes the characteristics in which the exhaust temperature TEX is raised to the higher level by the heat release of the catalyst 27 as the catalyst temperature TCAT grows the higher.

After the exhaust temperature TEX is thus estimated at Step 104 or Step 105, the routine proceeds to Step 106, at which the catalyst temperature TCAT(n-1), as estimated by the preceding processing, is compared with the exhaust temperature TEX to determine whether the catalyst temperature is rising or dropping. If the catalyst temperature TCAT is dropping (TCAT(n-1)>the exhaust temperature TEX), the routine proceeds to Step 107, at which the catalyst temperature TCAT(n) at this time is calculated from the following Equation:

$$TCAT(n)=TCAT(n-1)-K1\times|TCAT(n-1)-TEX|.$$

Here, K1 designates a coefficient to be set according to the intake flow rate Q by using the data table of FIG. 6, as stored in the ROM 33. The coefficient K1 may be set to is different values in dependence upon whether the fluctuation of the engine RPM Ne is high (in an unsteady time) or low (in a steady state).

If the catalyst temperature TCAT is rising (TCAT(n-1)≦ the exhaust temperature TEX), on the other hand, the routine proceeds to Step 108, at which the catalyst temperature TCAT(n) at this time is calculated from the following Equation:

$$TCAT(n)=TCAT(n-1)+K2\times|TCAT(n-1)-TEX|.$$

Here, K2 designates a coefficient to be set according to the intake flow rate Q by using the data table of FIG. 6, as stored in the ROM 33.

During the fuel cut, the coefficients K1 and K2 may be fixed at constant values.

After the catalyst temperature TCAT is thus estimated at Step 107 or Step 108, the routine returns to Step 110, at which it is determined whether or not the catalyst temperature TCAT has exceeded a deterioration detection starting temperature, e.g., 150° C. If this answer is "No", the present routine is ended without executing any subsequent catalyst deterioration detection. This is because before the catalyst temperature TCAT reaches the deterioration detection starting temperature, the downstream oxygen sensor 29 is at a low temperature and has an unstable sensor output VOX2 so that the deterioration detecting accuracy may be prevented from dropping by inhibiting the catalyst deterioration detection during this time period.

Figure 7:
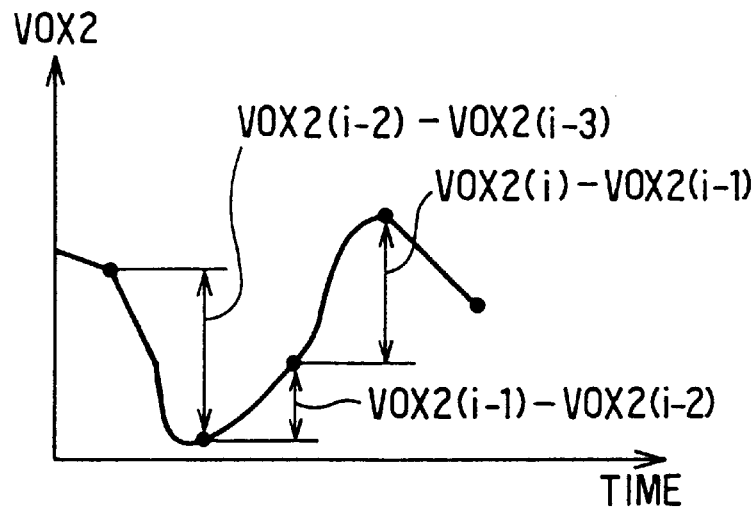
FIG. 7 is a graph for explaining a method of calculating data ΣV (i.e., a locus of the output voltage fluctuation of a downstream oxygen sensor) reflecting the amount of purified gas component.

At the instant, moreover, when the catalyst temperature TCAT exceeds the deterioration detection starting temperature (e.g., 150° C.), the routine proceeds to Step 120, at which a timer counter 1 is incremented. At next Step 130, data ΣV1 (i.e., the locus of the output voltage fluctuation of the downstream oxygen sensor 29), as reflecting the amount of purified gas component is calculated by the following Equation (as shown in FIG. 7):

$$\Sigma V1(n)=\Sigma V1(n-1)+|VOX2(i)-VOX2(i-1)|.$$

Here, VOX2(i) designate the output voltage of the downstream oxygen sensor 29 at this processing time, and VOX2 (i-1) designate the output voltage of the downstream oxygen sensor 29 at the preceding processing time. In short, the above Equation evaluates the amount of purified gas component in the catalyst 27 by integrating the changing widths of the output voltage VOX2 of the downstream oxygen sensor 29 at the predetermined sampling interval (e.g., 64 msecs.) to determine the locus of the output voltage fluctuation of the downstream oxygen sensor 29.

Figure 8:
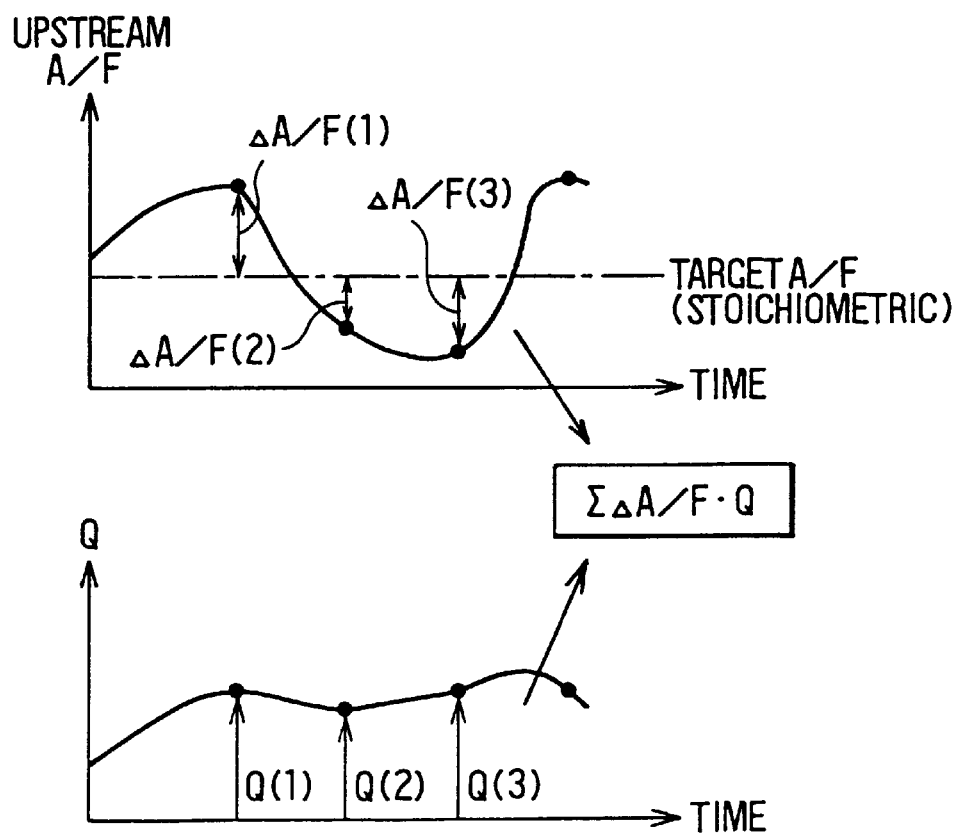
FIG. 8 is a diagram for explaining a method of calculating data ΣΔA/F•Q, as numerated from a fluctuation of the gas component flowing into the catalyst.

At Step 130, moreover, the data ΣΔA/F•Q1, as numerated from the fluctuation of the gas component flowing into the catalyst, are calculated from the following Equation (as shown in FIG. 8):

$$\Sigma\Delta A/F\bullet Q1(n)=\Sigma\Delta A/F\bullet Q1(n-1)+Q\times|\text{Target }A/F-A/F|.$$

Here, Q designates the intake flow rate Q which is detected by the air flow meter 10 and used as the data substituting the exhaust gas flow rate. The exhaust gas flow rate may be not only substituted by the intake flow rate but also actually measured or estimated from other data. The exhaust gas flow rate may naturally be estimated from the intake air flow rate. A/F designate the output voltage (i.e., the air/fuel ratio of the exhaust gas) of the upstream air/fuel sensor 28, and the target A/F is the air/fuel ratio (e.g., the stoichiometric air/fuel ratio) to become the target for the air/fuel ratio control. The aforementioned Equation determines the data ΣΔA/F•Q1 of the fluctuation of the gas component flowing into the catalyst by multiplying the deviation |Target A/F-A/F| from the target A/F of the A/F, as detected at the predetermined sampling interval (e.g., 64 msecs.) by the upstream air/fuel ratio sensor 28, by the exhaust gas flow rate (=the intake flow rate Q) and by integrating the multiplied products.

After this, it is determined at Step 140 whether or not the counted value of the timer counter 1 exceeds 10 secs. If this answer is "No", the processing operations of the foregoing Steps 110 to 130 are repeated. As a result, the values of ΣV1 and ΣΔA/F•Q1 are calculated for 10 seconds. When the counted value of the time counter 1 exceeds 10 secs., the routine proceeds to Step 150, at which it is determined whether or not the data $\Sigma\Delta A/F\cdot Q1$ of the gas component flowing into the catalyst for 10 secs. is within a predetermined range. If this answer is "Yes", the routine proceeds to Step 160, at which the data $\Sigma V$ are updated by integrating the present value $\Sigma V1$ with the integrated value $\Sigma V$ of the preceding values $\Sigma V1$, and the value $\Sigma\Delta A/F\cdot Q$ is updated by integrating the present value $\Sigma\Delta A/F\cdot Q1$ with the integrated value $\Sigma\Delta A/F\cdot Q$ of the preceding values $\Sigma\Delta A/F\cdot Q1$. After this, the routine proceeds to Step 170, at which both the time counter 1 and the values $\Sigma V1$ and $\Sigma\Delta A/F\cdot Q1$ or cleared (or invalidated).

If, on the other hand, it is determined at the preceding Step 150 that the data $\Sigma\Delta A/F\cdot Q1$ of the fluctuation of the gas component flowing into the catalyst have failed to fall within the predetermined range, the routine proceeds without the integration of the Step 160 to Step 170, at which both the time counter 1 and the values $\Sigma V1$ and $\Sigma\Delta A/F\cdot Q1$ are cleared (or invalidated). This is because if the fluctuation of the gas component flowing into the catalyst is excessively high or low, the calculation accuracy of the amount of purified gas component drops, so that when the data $\Sigma\Delta A/F\cdot Q1$ of the fluctuation of the gas component flowing into the catalyst fail to fall within the predetermined range, both the values $\Sigma V1$ and $\Sigma\Delta A/F\cdot Q1$ are cleared to leave the integration unprocessed, thereby to prevent the deterioration detecting accuracy from being lowered by the fluctuation of the gas component flowing into the catalyst.

At next Step 180, moreover, it is determined whether or not the catalyst temperature TCAT, as estimated at Step 100, exceeds a predetermined level 550° C. If this answer is "No", the present routine is ended without determining the deterioration of the catalyst 27. At the instant when the catalyst temperature TCAT exceeds the predetermined temperature 550° C., the routine proceeds to Step 190, at which it is determined whether or not the catalyst 27 is deteriorated, by comparing the data $\Sigma V$ (i.e., the locus of the output voltage fluctuation of the downstream oxygen sensor 29), as having been integrated till then as reflecting the amount of purified gas component, with a predetermined deterioration determining reference value.

Figures 9, 10:
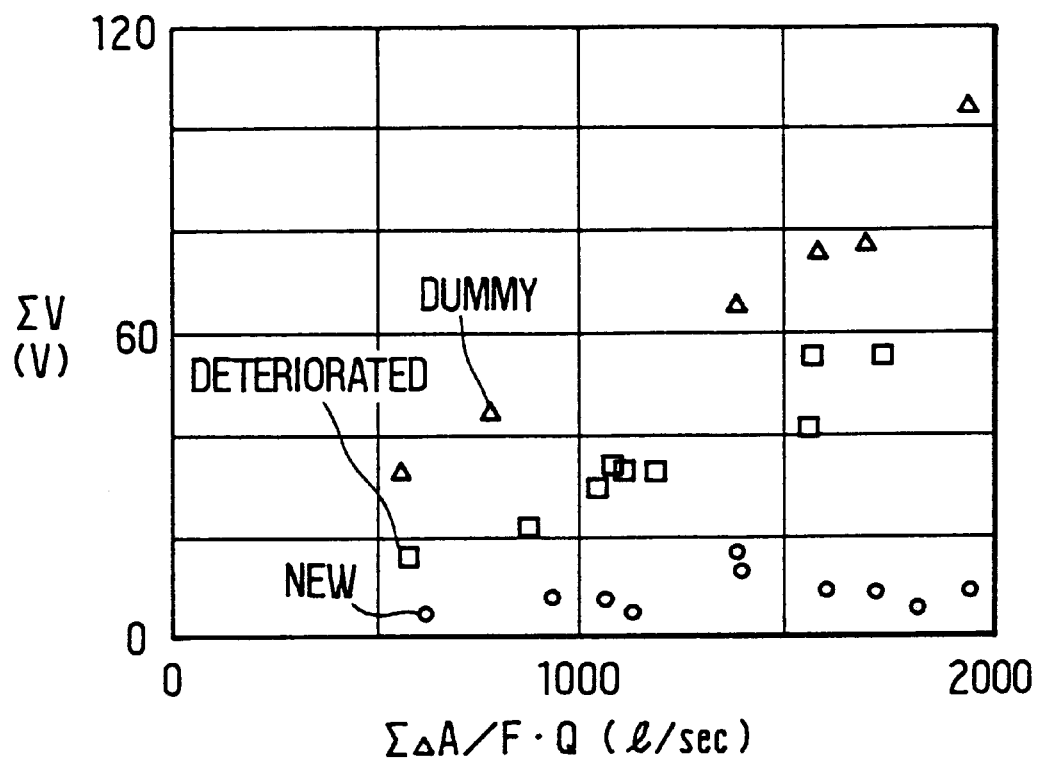
FIG. 9 is a diagram representing the measured relations between the data ΣV reflecting the amount of purified gas component and the data ΣΔA/F•Q of the fluctuation of the gas component flowing into the catalyst.
FIG. 10 is a diagram showing a data table specifying a relation between the data ΣΔA/F•Q of the fluctuation of the gas component flowing into the catalyst and a deterioration determining value.

Here will be described the catalyst deterioration detecting method with reference to FIG. 9. FIG. 9 plots the measured relations between the data $\Sigma V$, as reflecting the amount of purified gas component, and the data $\Sigma\Delta A/F\cdot Q$ of the fluctuation of the gas component flowing into the catalyst. In FIG. 9: symbol ○ indicates the measured values of a new catalyst; symbol □ indicates the measured values of a deteriorated catalyst; and symbol Δ indicates the measured values of a dummy catalyst (including only the ceramic carrier but having no catalyst layer on its surface). The new catalyst (as indicated by the symbol ○) has a tendency to have low data $\Sigma V$ independently of the magnitude of the data $\Sigma\Delta A/F\cdot Q$, but the deteriorated catalyst (as indicated by the symbol □) has a tendency to have the data $\Sigma V$ increased with the increase in the data $\Sigma\Delta A/F\cdot Q$. When the catalytic deterioration advances so extremely that it loses the catalytic action, the deteriorated catalyst takes a state similar to that of the dummy catalyst (as indicated by the symbol Δ). For the same data $\Sigma\Delta A/F\cdot Q$, therefore, it is implied that the catalytic deterioration advances the more for the larger data $\Sigma V$.

By making use of this relation, the deterioration determining reference value is set according to the data $\Sigma\Delta A/F\cdot Q$ by employing the data table of FIG. 10, as stored in A the ROM 33, so that whether or not the catalyst. 27 is deteriorated is determined in dependence upon whether or not the data $\Sigma V$ exceeds that deterioration determining value. If the data $\Sigma V$ are over the deterioration determining value, it is determined (at Step 200) that the catalyst is deteriorated. If the data $\Sigma V$ are below the deterioration determining value, it is determined (at Step 210) that the catalyst is normal.

In the present embodiment, the processing of calculating the data $\Sigma V$ corresponds to the calculation means, and the processing of detecting the catalytic deterioration on the basis of the data $\Sigma V$ and $\Sigma\Delta A/F\cdot Q$ corresponds to the catalytic deterioration detecting means.

In this case, at the time of detecting the deterioration of the catalyst 27, consideration is taken into not only the data $\Sigma V$ reflecting the amount of purified gas component but also the data $\Sigma\Delta A/F\cdot Q$ of the fluctuation of the gas component flowing into the catalyst till the catalyst 27 reaches the predetermined temperature (550° C.). This consideration makes it possible to perform a highly accurate catalyst deterioration detection while excluding the influences of the fluctuation of the gas component flowing into the catalyst.

According to the present embodiment thus far described, the catalyst deterioration is detected on the basis of the purification factor (or the amount of purified gas component) before the catalyst is warmed up, as shown in FIG. 11. Before this catalyst warm-up, the new catalyst and the deteriorated catalyst have a large difference in the purification factor so that the catalyst deterioration can be detected easily and accurately.

The deterioration determining reference value is changed in the present embodiment in accordance with the data $\Sigma\Delta A/F\cdot Q$, but the data $\Sigma V$ may be corrected according to the data $\Sigma\Delta A/F\cdot Q$.

As apparent from the relation between the values $\Sigma V$ and $\Sigma\Delta A/F\cdot Q$ represented in FIG. 9, moreover, there is a tendency for the gradient of the data $\Sigma V$ (i.e., $\Sigma V \div \Sigma\Delta A/F\cdot Q$) to rise the more as the catalyst deterioration grows the more. Hence, whether or not the catalyst is deteriorated may also be determined depending upon the magnitude of the gradient of the data $\Sigma V$ (i.e., $\Sigma V \div \Sigma\Delta E/F\cdot Q$).

In the present embodiment, moreover, the exhaust temperature is estimated from the engine load (Ne, Q) so that the catalyst temperature is estimated on the basis of the exhaust temperature. This raises an advantage that the temperature sensor for detecting the catalyst temperature can be omitted to reduce the cost for the parts. Despite this construction, however, the present invention may be modified such that a temperature sensor for detecting the exhaust temperature or the catalyst temperature is disposed in the exhaust system. In this modification, too, it is possible to achieve the desired object of the present invention fully.

In the present embodiment, moreover, the catalyst deterioration is detected on the basis of the amount of purified gas component at a catalyst temperature of 150 to 550° C. However, the calculation period of the amount of purified gas component should not be limited thereto but may be any if the difference in the purification factor between the new catalyst and the deteriorated catalyst is large, as shown in FIG. 11.

The catalyst deterioration detecting routine of FIG. 2 is executed while the engine 11 is cold-started (with the catalyst 27 being cold) but is not when the engine 11 in the warmed-up state is started again. This is because at the restart of the warm engine 11 the catalyst temperature TCAT has already arrived at or risen close to the activation temperature just after the restart. In this state, as shown in FIG. 11, the deteriorated catalyst and the new catalyst have so little difference in the exhaust gas purifying ability that they become difficult to discriminate (i.e., to detect the catalyst deterioration). At this time, whether or not the engine is cold at start is determined depending upon the engine cooling water temperature Thw, as detected by the water temperature sensor 38, and the intake temperature Tam, as detected by the intake temperature sensor 14.

By the same reasoning, the catalyst deterioration detecting routine of FIG. 2 is not executed even at the cold start when and after the catalyst temperature TCAT rises to a high level (e.g., 550° C.). When the catalyst temperature TCAT w grows high, as reasoned above, the deteriorated catalyst and the new catalyst have little difference in the exhaust gas purifying ability. This makes it difficult to discriminate the deteriorated catalyst and the new catalyst thereby to lower the catalyst deterioration detecting accuracy.

Second Embodiment

In the first embodiment, the downstream oxygen sensor 29 is disposed downstream of the catalyst 27. In the second embodiment, on the other hand, the downstream oxygen sensor 29 is replaced by a downstream air/fuel sensor, which is similar to the upstream air/fuel ratio sensor 28.

In this system, the deviations |the target A/F–the upstream A/F| of the upstream A/F from the target A/F, as detected by the upstream air/fuel ratio sensor at every predetermined sampling intervals (e.g., 64 msecs.), are multiplied by the exhaust gas flow rate (=the intake flow rate Q), and the multiplied products are integrated to determine the data $\Sigma \Delta A/Fin \cdot Q$ of the fluctuation of the gas component flowing into the catalyst (as this function will be called the first integration means), as follows:

$$\Sigma \Delta A/Fin \cdot Q(n) = \Sigma \Delta A/Fin \cdot Q(n-1) + Q \times |\text{the target } A/F - \text{the upstream } A/F|.$$

Moreover, the deviations |the target A/F–the downstream A/F| of the downstream A/f from the target A/F, as detected by the downstream air/fuel sensor at a predetermined sampling period, are multiplied by the exhaust gas flow rate (=the intake flow rate Q), and the multiplied products are integrated to determine the data $\Sigma \Delta A/Fout \cdot Q$ of the fluctuation of the gas component flowing out of the catalyst (as this function will be called the first integration means), as follows:

$$\Sigma \Delta A/Fout \cdot Q(n) = \Sigma \Delta A/Fout \cdot Q(n-1) + Q \times |\text{the target } A/F - \text{the downstream } A/F|.$$

By subtracting the data $\Sigma \Delta A/Fout \cdot Q$ of the fluctuation of the gas component flowing out of the catalyst from the data $\Sigma \Delta A/Fin \cdot Q$ of the fluctuation of the gas component flowing into the catalyst till the catalyst reaches a predetermined temperature, moreover, the amount of purified gas component is calculated, as hatched in FIGS. 12A and 12B, as follows:

$$\text{Amount of Purified Gas Component} = \Sigma \Delta A/Fin \cdot Q - \Sigma \Delta A/Fout \cdot Q.$$

After this, the amount of purified gas component is compared with a predetermined deterioration determining reference value. The catalyst is determined to be deteriorated, if the amount of purified gas component is smaller than the deterioration determining reference value, but to be normal if the same is larger. This makes it possible to detect a highly accurate catalyst deterioration detection considering the fluctuation of the gas component flowing into the catalyst and the fluctuation of the gas component flowing out of the catalyst.

If, in this case, the data $\Sigma \Delta A/Fin \cdot Q$ or $\Sigma \Delta A/Fout \cdot Q$ fails to fall within the predetermined range, it is preferable either to invalidate the data calculated for detecting the catalyst deterioration or to inhibit the catalyst deterioration detection itself.

Third Embodiment

Figure 13:
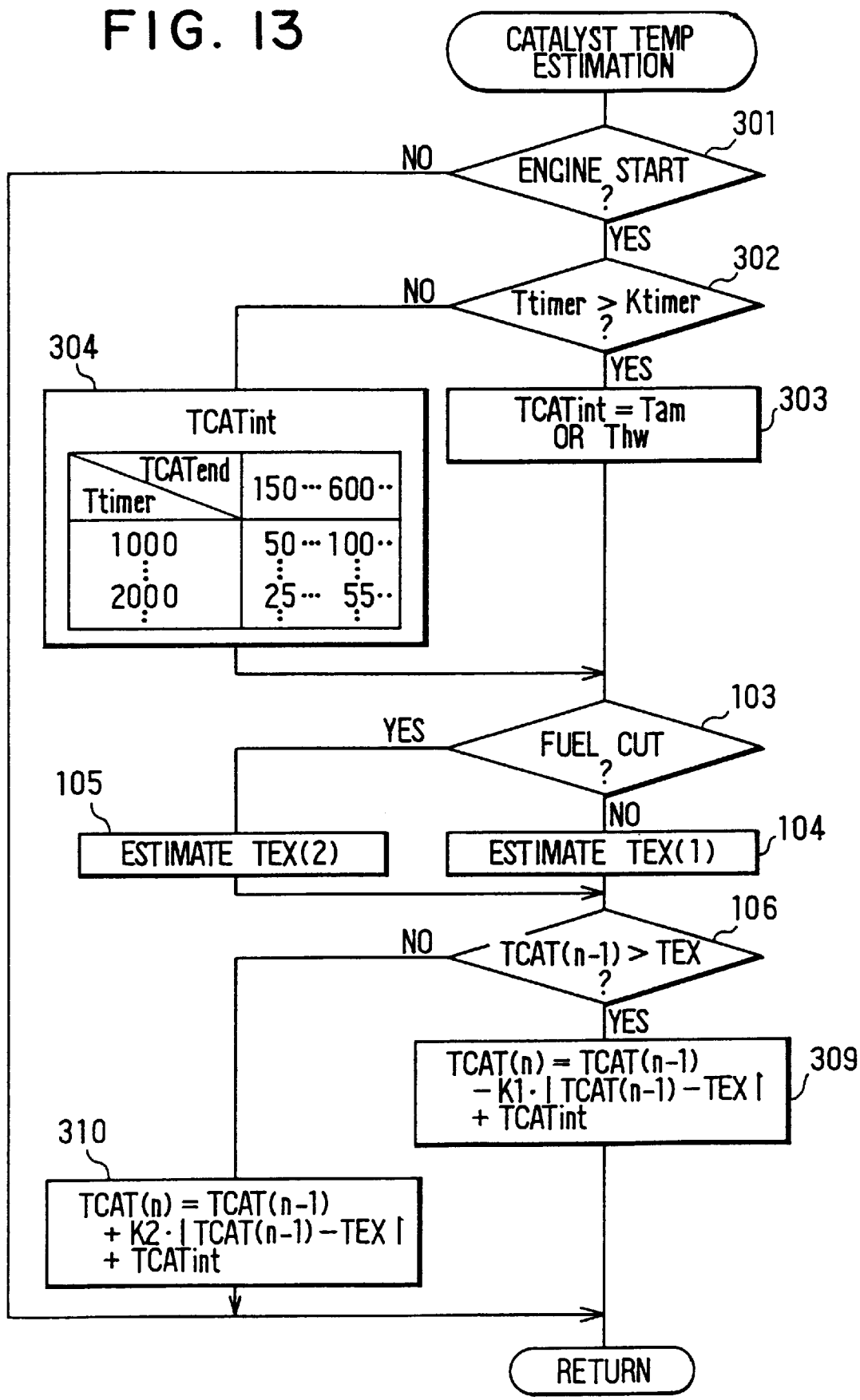
FIG. 13 is a flow chart showing a processing flow of a catalyst temperature estimating routine in a third embodiment of the present invention.

In this third embodiment, there is executed a catalyst temperature estimating routine, as shown in FIG. 13. The system of this embodiment is constructed as in the first embodiment such that the upstream air/fuel sensor 28 is arranged upstream of the catalyst 27 whereas the downstream oxygen sensor 29 is disposed downstream of the catalyst 27, as shown in FIG. 1. In the first embodiment, the catalyst temperature at the engine start is estimated as the intake temperature. On the other hand, this third embodiment is equipped with a timer (stop time measuring means) for measuring the time elapsed after a previous engine stop, so that the catalyst temperature TCATint at an engine start is set on the basis of the elapsed time after the engine stop and the catalyst temperature and the intake temperature (or the cooling water temperature) at the engine stop thereby to improve the estimation accuracy of the catalyst temperature.

Here will be described the processing of the catalyst temperature estimating routine of FIG. 13 for estimating the catalyst temperature. The lapse time is measured by the timer after the engine stop, and the routine proceeds from Step 301 to Step 302 at the engine start. It is then determined whether or not the measured time Ttimer of the timer, i.e., the elapsed time from the start to the stop of the engine exceeds a predetermined time Ktimer. Here, the predetermined time Ktimer is set to the value which is set for the catalyst temperature to drop to the ambient temperature (or the cooling water temperature) after the previous engine stop. If, therefore, the elapsed time Ttimer after the previous engine stop exceeds the predetermined time Ktimer, the routine proceeds to Step 303, at which the catalyst temperature TCATint at the engine start is set to the intake temperature Tam (or the ambient temperature). Alternatively, the catalyst temperature TCATint at the engine start may be set to the cooling water temperature Thw. This is because the intake temperature Tam (or the ambient temperature) and the cooling water temperature Thw are at substantially equal levels when the engine 11 comes into a completely cold state (at the lowest temperature).

Figure 14:
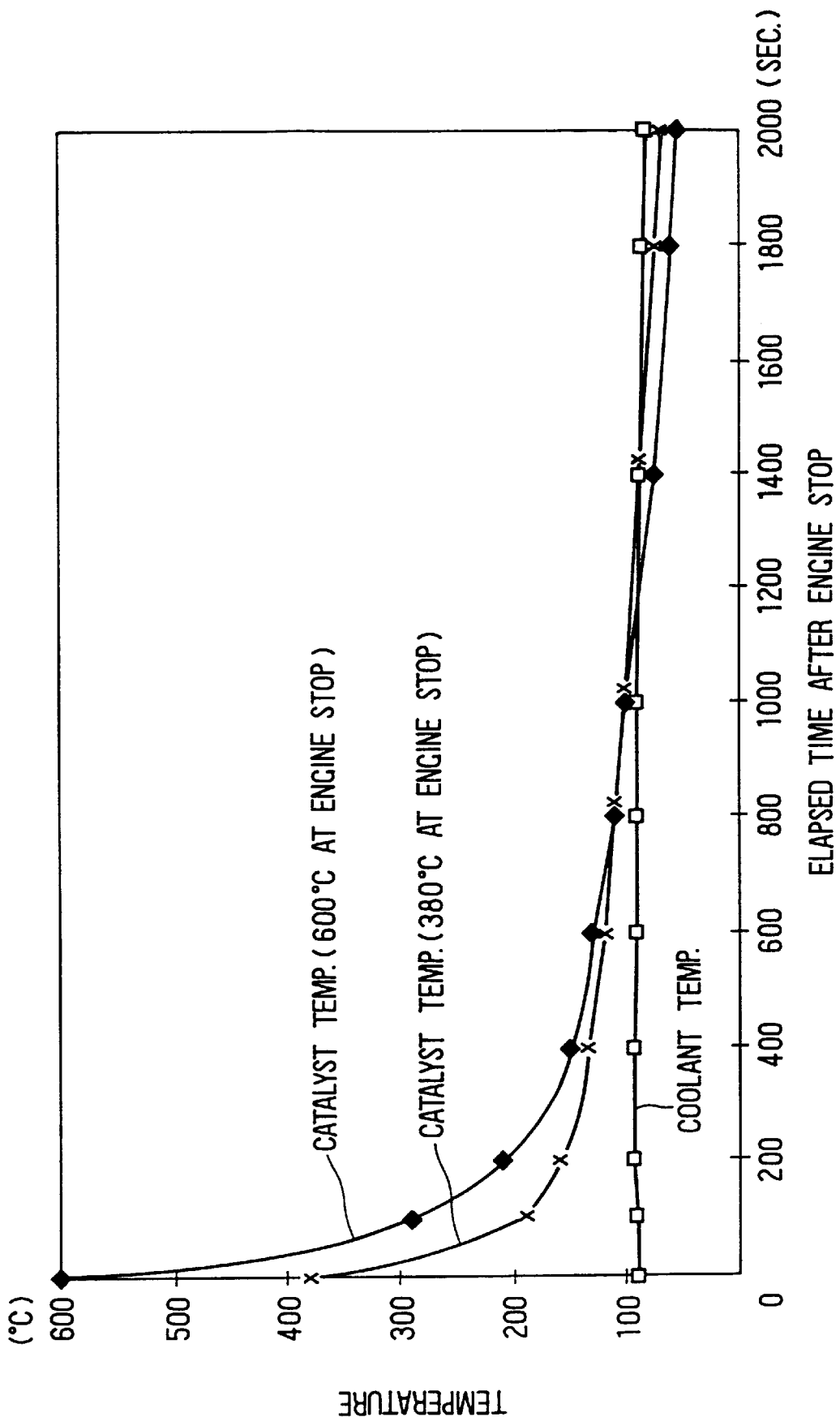
FIG. 14 is a time chart representing one example of the behaviors of a catalyst temperature and a cooling water temperature after an engine stop at an ambient temperature of 25° C.

If, on the contrary, it is determined at the aforementioned Step 302 that the elapsed time Ttimer after the previous engine stop has not elapsed the predetermined time Ktimer yet, the routine proceeds to Step 304, at which the catalyst temperature TCATint at the engine start is retrieved according to the catalyst temperature TCATend at the engine stop and the elapsed time Ttimer after the engine stop, from a two-dimensional map, as employing the catalyst temperature TCATend and the elapsed time Ttimer as parameters:

Here, FIG. 14 is a graph representing the measurement of the behaviors of the catalyst temperatures and the cooling water temperature after the engine stop for the ambient temperature of 25° C. The catalyst temperature behaviors are measured for the two examples of 600° C. and 380° C. at the engine stop. As apparent from these measurement results, the change in the catalyst temperature after the engine stop depends upon the catalyst temperature at the engine stop and the elapsed time after the engine stop and converges into a substantially constant catalyst temperature after lapse of some time period even if the catalyst temperatures at the engine stop are different. Considering these characteristics, the relations between the elapsed time after the engine stop and the catalyst temperature are mapped according to the test results or the simulations by using the catalyst temperature TCATend at the engine stop as parameters and are stored in the ROM 33 so that they may be used at the aforementioned Step 304.

Figure 15:
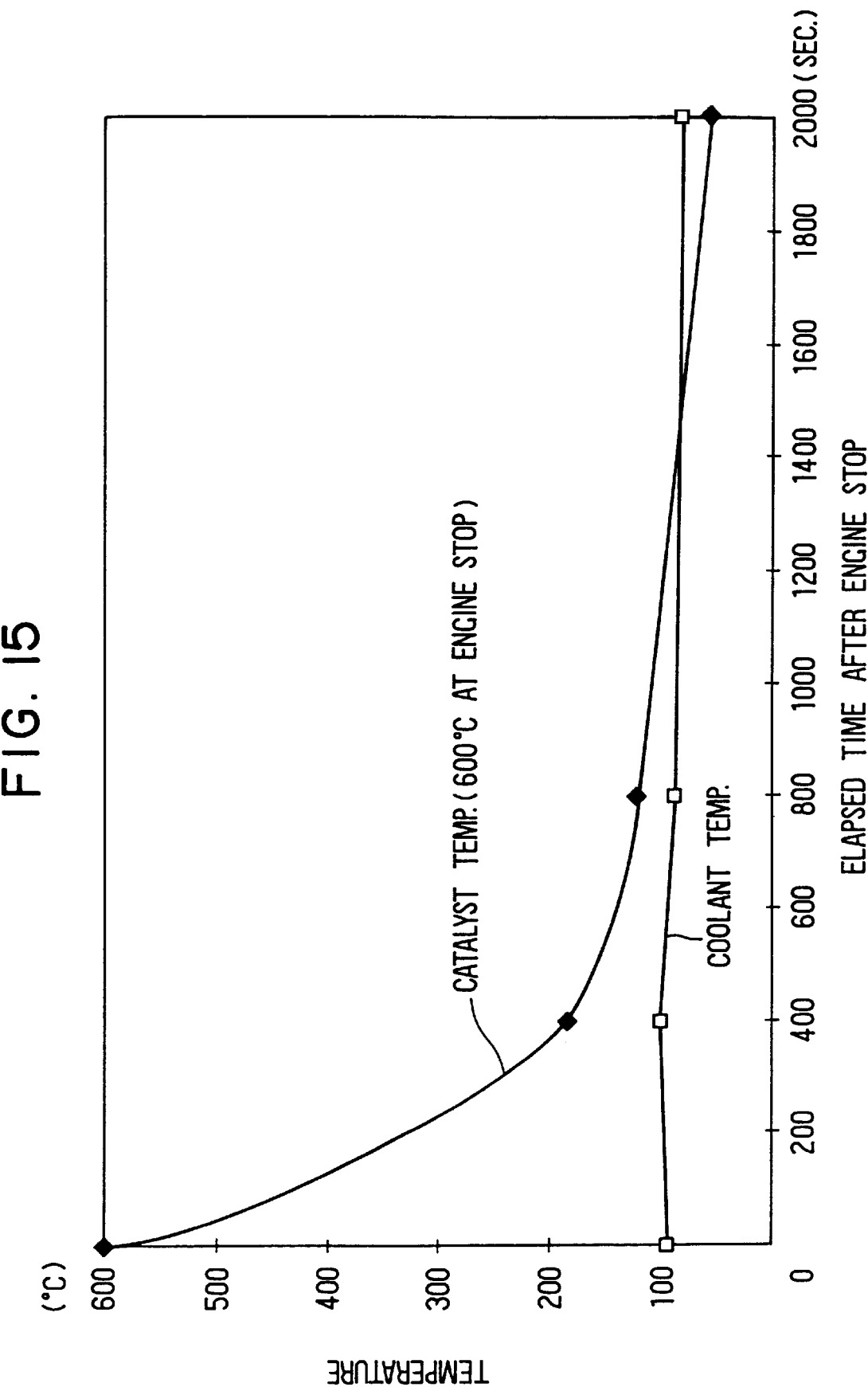
FIG. 15 is a time chart representing one example of the behaviors of the catalyst temperature and the cooling water temperature after an engine stop at an ambient temperature of 15° C.

The change in the catalyst temperature after the engine stop depends not only upon the TCATend and the Ttimer but also upon the ambient temperature. FIG. 15 is a graph representing the behaviors of the catalyst temperature and the cooling water temperature after the engine stop for the ambient temperature of 15° C. The change in the catalyst temperature is different from the measurement result for the ambient temperature of 25° C., as shown in FIG. 14. This is because even if the catalyst temperature at the engine stop is the same, the heat release from the catalyst 27 is promoted the more for the lower ambient temperature so that the catalyst temperature after the engine stop drops at the higher rate. This makes it arbitrary to correct the catalyst temperature TCATint, as retrieved from the aforementioned map, with the ambient temperature. This correction may be executed according to the following Equation by using a correction coefficient kam depending upon the ambient temperature (or the intake temperature), for example:

$$TCATint = TCATint \times kam.$$

Here, the correction coefficient kam depending upon the ambient temperature (or the intake temperature) is retrieved from a data map. The correction coefficient kam may be 1 at the ambient temperature of 25 degrees centigrade and increases and decreases as the ambient temperature increases and decreases, respectively.

Thus, at Step 303 or 304, the catalyst temperature TCATint at the engine start is set. After this, the exhaust temperature TEX is estimated by considering whether or not the fuel is being cut. The method of estimating the exhaust temperature TEX is identical to the operations of Steps 103 to 105 of FIG. 3, as has been described in the first embodiment.

After the exhaust temperature TEX is estimated at Step 104 or 105, the routine proceeds to Step 106, at which the catalyst temperature TCAT(n−1), as estimated at the preceding processing is compared with the exhaust temperature TEX, to determine whether or not the catalyst is dropping or rising. If the catalyst temperature TCAT is dropping (TCAT(n−1)>the exhaust temperature TEX), the routine proceeds to Step 309, at which the catalyst temperature TCAT(n) at this time is calculated from the following Equation by considering the catalyst temperature TCATint at the engine start:

$$TCAT(n) = TCAT(n-1) - K1 \times |TCAT(n-1) - TEX| + TCATint.$$

Here, K1 designates a coefficient to be set according to the intake flow rate Q by using the data table of FIG. 6, as stored in the ROM 33. The coefficient K1 may be set to different values for the large fluctuation (at the unsteady time) and the small fluctuation (at the steady time) of the engine RPM Ne.

If, on the other hand, the catalyst temperature TCAT is rising (TCAT(n−1)<the exhaust temperature TEX), the routine proceeds to Step 310, at which the catalyst temperature TCAT(n) at this time is calculated from the following Equation by considering the catalyst temperature TCATint at the engine start:

$$TCAT(n) = TCAT(n-1) - K2 \times |TCAT(n-1) - TEX| + TCATint.$$

Here, K2 designates a coefficient to be set according to the intake flow rate Q by using the data table of FIG. 6, as stored in the ROM 33.

During the fuel cut, the coefficients K1 and K2 may be fixed at constant values.

Thus, the catalyst temperature TCAT is estimated at Step 309 or 310, and the routine is then returned to Step 110 of FIG. 2 to execute the catalyst deterioration detection.

According to this third embodiment, at Steps 302 and 303, on the basis of the elapsed time after the engine stop and the catalyst temperature and the intake temperature (or the cooling water temperature) at the engine stop, the catalyst temperature TCATint at the engine start is estimated so that the catalyst temperature TCAT after the engine start is estimated on the basis of that level TCATint. As a result, the estimation accuracy of the catalyst temperature can be improved to improve the catalyst deterioration detecting accuracy.

Fourth Embodiment

Figure 16:
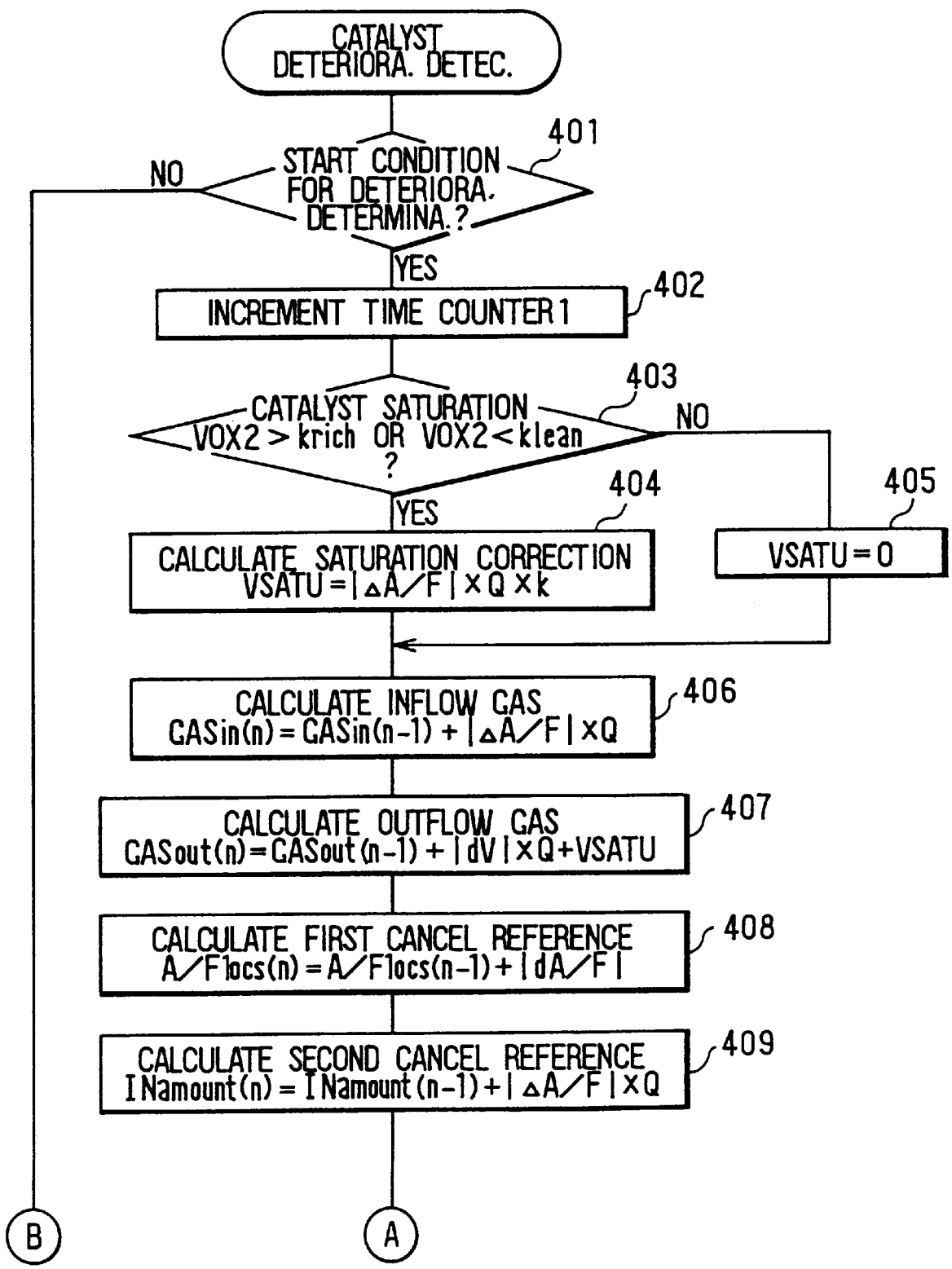
FIG. 16 is a flow chart showing a processing flow of a first half of a catalyst deterioration detecting routine in a fourth embodiment of the present invention.
Figure 17:
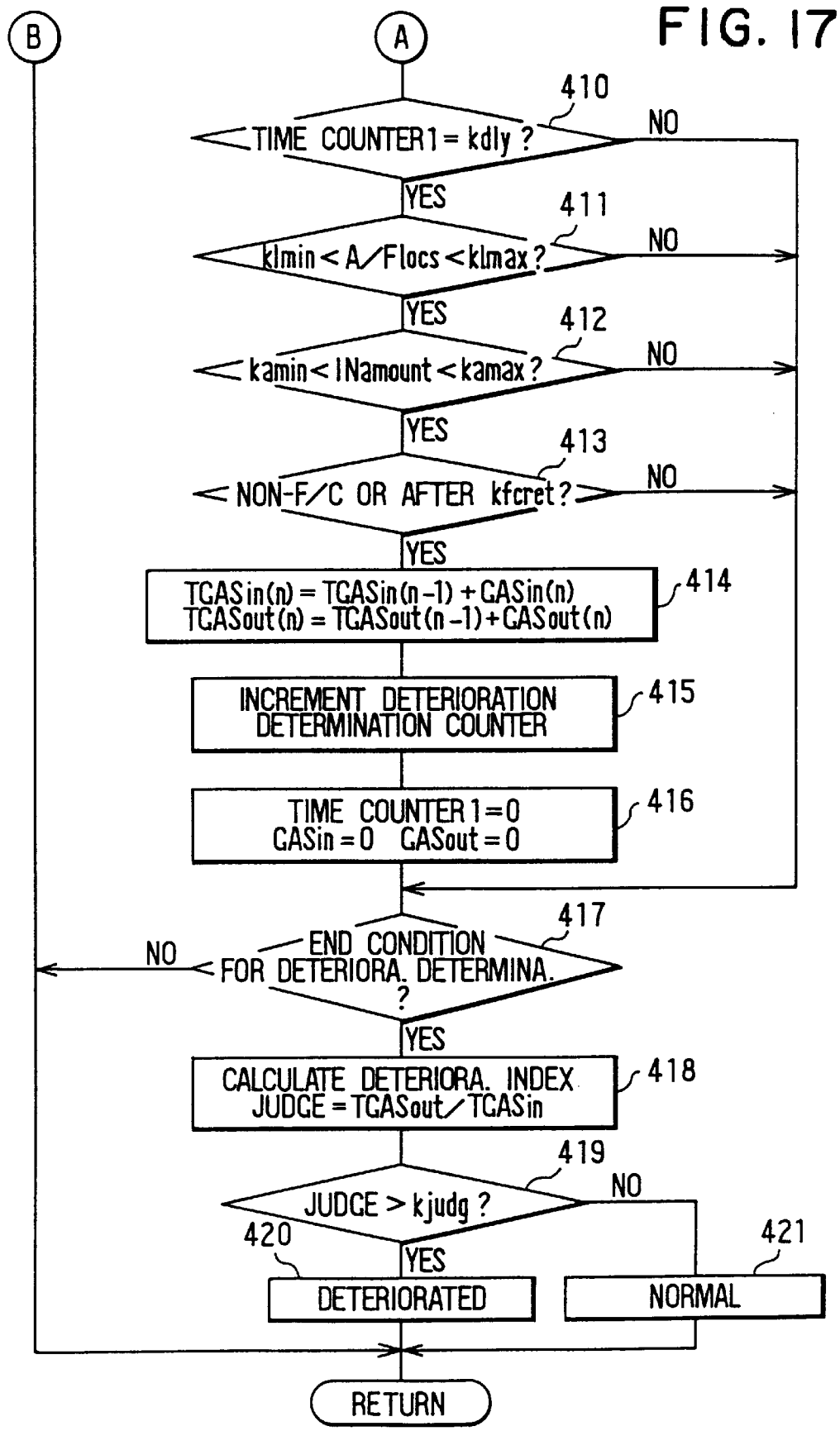
FIG. 17 is a flow chart showing a processing flow of a second half of the catalyst deterioration detecting routine of FIG. 16.

In this fourth embodiment, there is executed a catalyst deterioration detecting routine, as shown in FIGS. 16 and 17. The system construction of the fourth embodiment is identical to that of the first embodiment such that the upstream air/fuel sensor 28 is disposed upstream of the catalyst 27 whereas the downstream oxygen sensor 29 is disposed downstream of the catalyst 27, as shown in FIG. 1.

The catalyst deterioration detecting routine, as shown in FIGS. 16 and 17, is executed by an interruption processing at every predetermined time intervals (e.g., every 64 msecs.). When the processing of this routine is started, it is determined at first Step 401 whether or not the catalyst deterioration determining calculation starting condition is satisfied. Here, whether or not the catalyst deterioration determining calculation starting condition is satisfied is determined by the catalyst deterioration determining calculation starting condition determining routine, as shown in FIG. 18 or 19.

Figure 18:
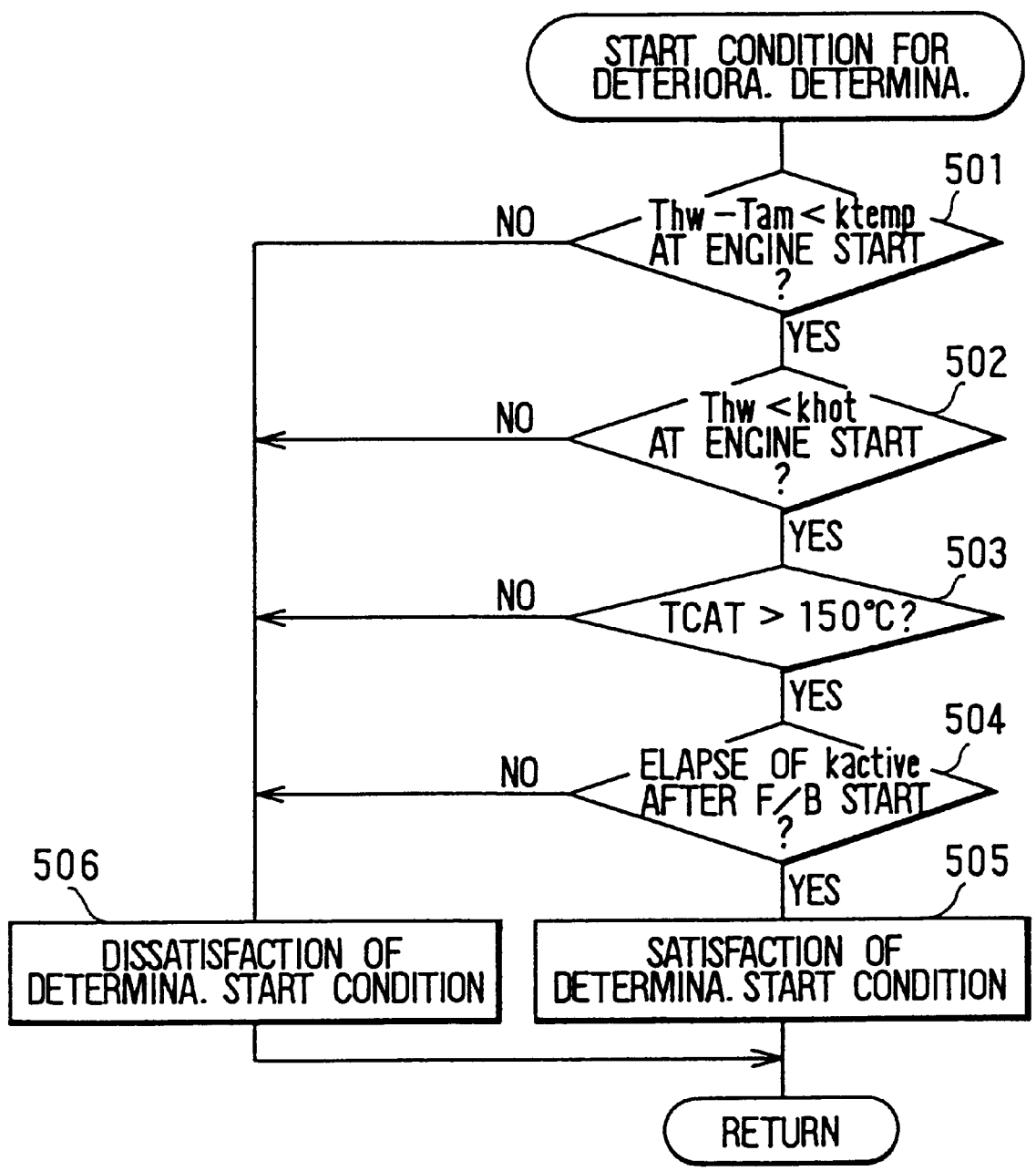
FIG. 18 is a flow chart showing a processing flow of a catalyst deterioration determining calculation starting condition determining routine to be used in a system having neither a catalyst temperature sensor nor a timer for measuring the elapsed time after an engine stop.
Figure 19:
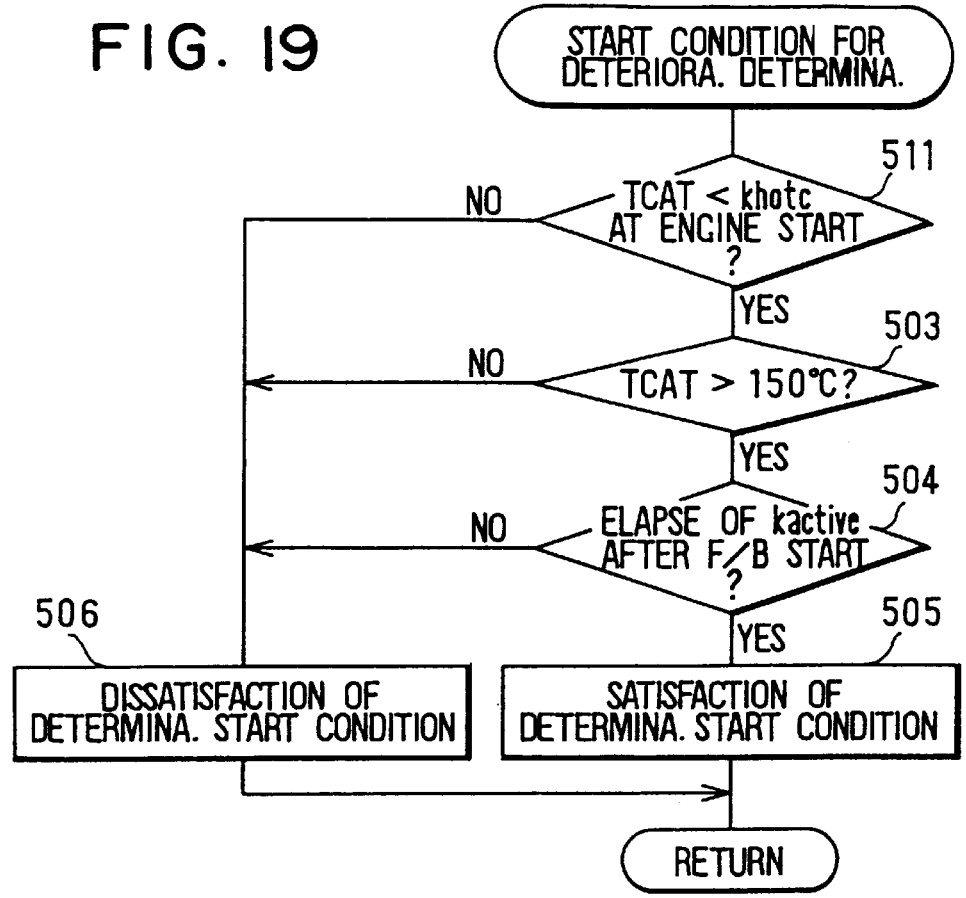
FIG. 19 is a flow chart showing a processing flow of a catalyst deterioration determining calculation starting condition determining routine to be used in a system having a catalyst temperature sensor or a timer for measuring the elapsed time after an engine stop.

The catalyst deterioration determining calculating starting condition determining routine, as shown in FIG. 18, is applied to a system which omits the catalyst temperature sensor or the timer for measuring the time elapsed after the previous engine stop. It is impossible for this system to estimate the catalyst temperature at the engine start. In the present routine, therefore, at first Step 501, it is determined whether or not the catalyst temperature has sufficiently dropped at the engine start. For this determination, it is determined whether or not the difference (Thw−Tam) between the cooling water temperature Thw and the intake air Tam at the engine start is smaller than a predetermined value ktemp. If the catalyst temperature at the engine start is sufficiently low, the cooling water temperature Thw has sufficiently dropped so that the cooling water temperature Thw and the intake air Tam at the engine start take substantially the same levels to reveal Thw−Tam<ktemp. The intake temperature Tam may be replaced by the ambient temperature.

If Thw−Tam<ktemp, the routine proceeds to Step 502, at which whether or not the engine 11 is in the cold state is determined from whether or not the cooling water temperature Thw at the engine start is lower than a predetermined temperature khot. If this answer is "Yes", the routine proceeds to Step 503, at which it is determined whether or not the catalyst temperature TCAT, as estimated by the aforementioned catalyst temperature estimating routine of FIG. 3, is higher than a predetermined level (i.e., the temperature for a portion of the catalyst 27 to become active, such as 150° C.). If this answer is "Yes", the routine proceeds to Step 504, at which it is determined whether or not a predetermined time kactive for the air/fuel feedback to become stable has been elapsed after the upstream air/fuel sensor 28 is completely activated (or after the air/fuel feedback is started). If this answer is "Yes", the routine proceeds to Step 505, at which it is determined that the catalyst deterioration determining calculating starting condition is satisfied.

If, on the contrary, any of the answers of Steps 501 to 504 is "No", the routine proceeds to Step 506, at which it is determined that the catalyst deterioration determining calculation starting condition is dissatisfied to inhibit the catalyst deterioration determining calculation.

Here will be described the reason why the catalyst deterioration determining calculation starting condition relies upon the determination regarding whether or not the predetermined time kactive is elapsed after the upstream air/fuel sensor 28 is completely activated (i.e., after the air/fuel feedback is started). Immediately after the engine start, the air/fuel is enriched by the increase in the fuel for the start till the air/fuel feedback is started. In this meanwhile, the catalyst temperature is still low so that the rich fuel component (unburnt gas) is adsorbed by the catalyst 27. As a result, the air/fuel feedback is started with much rich component being adsorbed in the catalyst 27, so that the air/fuel feedback is unstable immediately after its start. In order that the catalyst deterioration determining calculation may be started after the air/fuel feedback is stabilized, therefore, it is determined at Step 504 whether or not the predetermined time kactive has been elapsed.

In this case, whether or not the air/fuel feedback is stable is determined from whether or not the predetermined time kactive has been elapsed after the start of the air/fuel feedback. Alternatively, whether or not the air/fuel feedback is stabilized may be determined from whether or not the output of the upstream air/fuel sensor 28 has crossed the target air/fuel after the start of the air/fuel feedback, and the catalyst deterioration determining calculation may be inhibited till the output of the upstream air/fuel sensor 28 crosses at first the target air/fuel after the start of the air/fuel feedback. By this modification, too, the catalyst deterioration determining calculation can be started after the air/fuel feedback is stabilized.

On the other hand, the catalyst deterioration determining calculation starting condition determining routine, as shown in FIG. 19, is applied to the system which is equipped with either the catalyst temperature sensor or the timer for measuring the elapsed time after the previous engine stop. In this system, the catalyst temperature at the engine start can be estimated either from the output value of the catalyst temperature sensor or by the aforementioned catalyst temperature estimating routine of FIG. 13. In the present routine, therefore, at first Step 511, whether or not the engine is cold is determined from whether or not the catalyst temperature TCAT at the engine start is lower than a predetermined level khotc. If this answer is "Yes", the routine proceeds to Step 503, at which it is determined whether or not the catalyst temperature TCAT is higher than a predetermined level (i.e., the temperature for a portion of the catalyst 27 to begin to become active, such as 150° C.). If this answer is "Yes", the routine proceeds to Step 504, at which it is determined whether or not the time kactive, as required for the air/fuel feedback to stabilize, has been elapsed after the upstream air/fuel sensor 28 is completely activated (i.e., after the air/fuel feedback is started). If this answer is "Yes", the routine proceeds to Step 505, at which it is determined that the catalyst deterioration determining calculation starting condition is satisfied.

If any of the answers of Steps is "No", on the contrary, the routine proceeds to Step 506, at which it is determined that the catalyst deterioration determining calculation starting condition is dissatisfied to inhibit the catalyst deterioration determining calculation.

If it is thus determined by the catalyst deterioration determining calculation staring condition determining routine of FIG. 18 or 19 that the catalyst deterioration determining calculation starting condition is dissatisfied, the catalyst deterioration detecting routine of FIG. 16 is not executed so that the catalyst deterioration is not detected. If the catalyst deterioration determining calculation starting condition is satisfied, the routine proceeds to Step 402 of FIG. 16, at which the time counter 1 is incremented, and the operations of Steps 403 to 409 are repeated till the time counter 1 achieves a predetermined time kdly (e.g., 10 secs.). Here, this predetermined time kdly is set, by detecting the flow rate of the gas flowing into the catalyst 27 by the upstream air/fuel sensor 28, to such a value as to absorb the influences of the delay time till the gas is detected through the reaction in the catalyst 27 by the downstream oxygen sensor 29.

Figure 21:
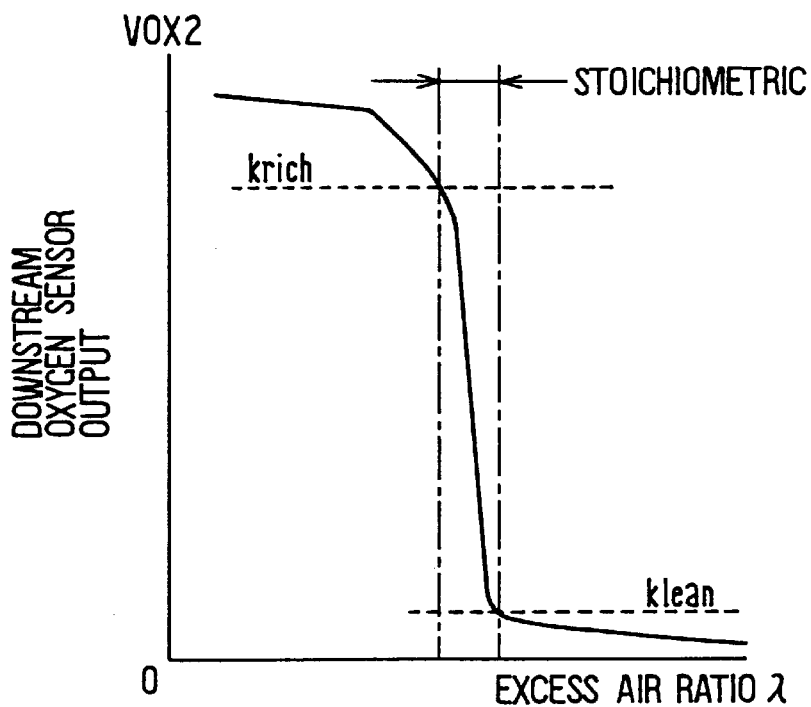
FIG. 21 is a graph representing the static characteristics of a downstream oxygen sensor.

At Step 403, the catalyst saturation determination is executed while considering the static characteristics of the downstream oxygen sensor 29. The output voltage VOX2 of the downstream oxygen sensor 29 changes linearly against an excess air ratio $\lambda$ in the vicinity of the stoichiometric ratio, as shown in FIG. 21. In the region apart from this stoichiometric ratio, however, the output voltage VOx2 of the downstream oxygen sensor 29 does not change so much even if the excess air ratio $\lambda$ changes, so that the amount of gas component flowing out of the catalyst 27 cannot be accurately detected. In the region apart from the stoichiometric ratio, that is, in the region of VOX2>krich or VOX2<klean, it is-deemed that the catalyst 27 is saturated. In the saturated catalyst state, the ratio to be purified in the catalyst 27 so that the amount of gas component flowing out of the catalyst has a correlation with the amount of gas component flowing into the catalyst.

In the case of the catalyst saturation, therefore, the routine proceeds to Step 404, at which the amount of gas component flowing out of the catalyst (VSATU (as will be called the "catalyst saturation correction"), as cannot be detected from the change in the output of the downstream oxygen sensor 29, is calculated from the following Equation by making use of the output value of the upstream air/fuel sensor 28:

$$VSATU = |\Delta A/F| \times Q \times k.$$

Here: $|\Delta A/F|$ designate an absolute value of the deviation of the output value (i.e., the actual air/fuel ratio) of the upstream air/fuel sensor 28 from the target air/fuel ratio; Q designates the flow rate of air flowing into the cylinder; and k designates a conversion coefficient between the output value of the upstream air/fuel sensor 28 and the output value of the downstream oxygen sensor 29.

If not in the catalyst saturation at the aforementioned Step 403, i.e., if klean$\leq$VOX2$\leq$krich (or the stoichiometric range), on the contrary, the routine proceeds to Step 405, at which the catalyst saturation correction VSATU is set to 0. This is because the amount of gas component flowing out of the catalyst can be calculated from the change in the output voltage VOX2 of the downstream oxygen sensor 29.

Figure 22:
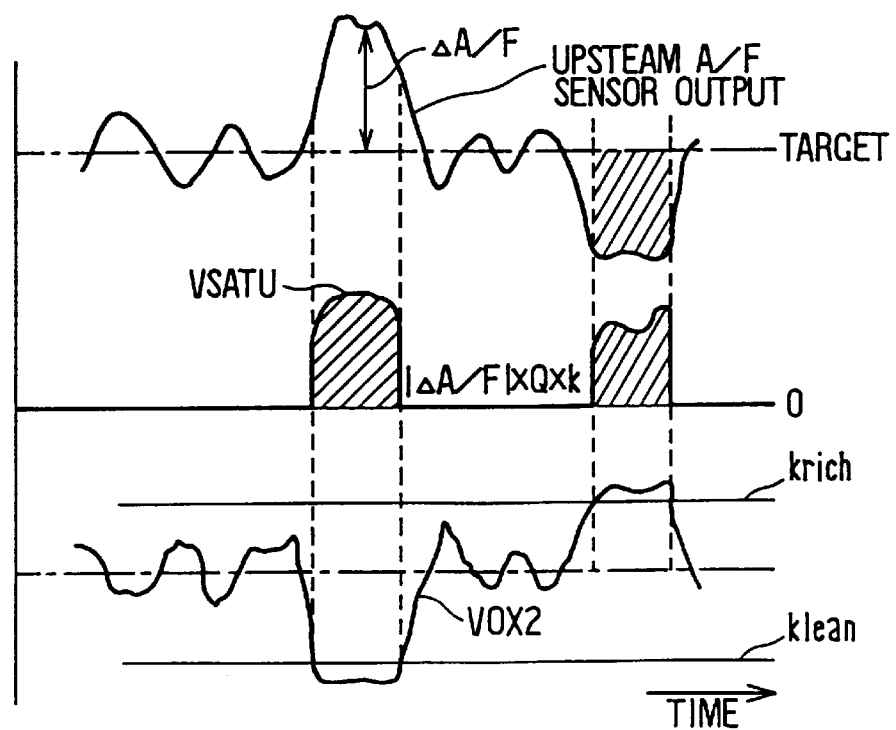
FIG. 22 is a time chart for explaining the relations among the output value of an upstream oxygen sensor, a catalyst saturation correction value VSATU, and the output value of a downstream oxygen sensor in the fourth embodiment of the present invention.

One example of the catalyst saturation correction VSATU thus set is illustrated in FIG. 22. In the case of klean$\leq$VOX2$\leq$krich, as apparent from FIG. 22, the catalyst saturation correction VSATU is kept at 0. In the case of VOX2<klean or VOX2>krich, on the other hand, the catalyst saturation correction VSATU is calculated by calculating $|\Delta A/F| \times Q \times k$. As a result, the catalyst saturation correction VSATU is so proportional to $|\Delta A/F| \times Q$ that it grows the larger for the larger $|\Delta A/F| \times Q$ or the larger amount Q of air flowing into the cylinder.

After the catalyst saturation correction VSATU is thus set at Step 404 or 405 of FIG. 16, the routine proceeds to Step 406, at which the amount GASin of gas component flowing into the catalyst 27 is calculated from the following Equation:

$$GASin(n) = GASin(n-1) + |\Delta A/F| \times Q.$$

Here, GASin(n) designates the present amount of gas component flowing into the catalyst, and GASin(n−1) designates the amount of gas component flowing into the catalyst, as calculated at the preceding time.

After this, at Step 407, the amount GASout of gas component flowing out of the catalyst 27 is calculated from the following Equation by using the catalyst saturation correction VSATU:

$$GASout(n) = GASout(n-1) + |dV| \times Q + VSATU.$$

Here: GASout(n) designates the present amount of gas component flowing out of the catalyst; GASout(n−1) designates the amount of gas component flowing out of the catalyst, as calculated at the preceding time; and |dV| designates the absolute value {|dV|=VOX2(n)−VOX2(n−1)} of the output voltage change of the downstream oxygen sensor 29.

This Step 407 performs the second calculation and Steps 404 and 407 perform saturation correcting.

At next Step 408, the output change A/Flocs of the upstream air/fuel sensor 28 within a predetermined time kdly (e.g., 10 secs.) is calculated as a first cancel determination reference from the following Equation:

$$A/Flocs(n) = A/Flocs(n-1) + |dA/F|.$$

Here, |dA/F| designates the absolute value of the difference between the output value of the upstream air/fuel sensor 28 at this time and the output value of the upstream air/fuel sensor 28 at the preceding time.

After this, at Step 409, the value INamount is calculated as a second cancel determination reference from the following Equation:

$$INamount(n) = INamount(n-1) + |\Delta A/F| \times Q.$$

Here, INamount(n) is identical to the amount GASin of gas component flowing into the catalyst, as calculated at the foregoing Step 406.

The operations of Steps 402 to 409 thus far described are repeated for the predetermined time kdly (e.g., 10 secs.). After lapse of this predetermined time kdly, the routine proceeds from Step 410 to Step 411 of FIG. 17, at which it is determined whether or not the output change A/Flocs of the upstream air/fuel sensor 28 in the predetermined time kdly, as calculated at Step 408, is within a predetermined range (klmin<A/Flocs<klmax). If this answer is "No", the result is not reflected upon the later-described catalyst deterioration index, but the routine skips to Step 417.

If the output change A/Flocs of the upstream air/fuel sensor 28 in the predetermined time kdly is lower than the predetermined range (A/Flocs≦klmin), the output value of the upstream air/fuel sensor 28 is stoichiometric. This upstream air/fuel sensor 28 has a poor resolution in the vicinity of the stoichiometric ratio to degrade the calculating accuracy of the amount of gas component flowing into the catalyst. Thus, the result is not reflected upon the catalyst deterioration index if A/Flocs≦klmin.

If the A/Flocs is no more than the predetermined range (A/Flocs≧klmax), on the other hand, this means that the output value of the upstream air/fuel sensor 28 is controlled in a region extremely apart from the stoichiometric ratio. When the output value of the upstream air/fuel sensor 28 goes extremely apart from the stoichiometric ratio, the output of the upstream air/fuel sensor 28 cannot keep a linear relation to the excess air ratio λ (or the air/fuel ratio). As a result, in the case of A/Flocs≧klmax, too, the calculating accuracy of the amount of gas component flowing into the catalyst is deteriorated so that the result is not reflected upon the catalyst deterioration index.

If the A/Flocs is within the predetermined range (klmin<A/Flocs<klmax), on the other hand, the upstream air/fuel sensor 28 has an excellent resolution, and its output has an excellent linear characteristics so that the calculation accuracy of the amount of gas component flowing into the catalyst can be sufficiently retained. If the A/Flocs is within the predetermined range, therefore, the routine proceeds to Step 412, at which it is determined whether or not the value INamount, as calculated at the foregoing Step 409, is within co the predetermined range (Kamin<INamount<kamax). If this answer is "No", the result is not reflected upon the catalyst deterioration index, and the routine skips to Step 417. Here, the value INamount corresponds to the amount of gas component flowing into the catalyst, as can contribute to the catalytic reaction for the predetermined time kdly. If the value INamount is no more than the predetermined range (INamount≦kamin), the result is not reflected upon the catalyst deterioration index by the same reasoning as that of the foregoing case of A/Flocs≦klmin.

If the value INamount is not less than the predetermined range (INamount≧kamax), on the other hand, the flow speed of the gas flowing into the catalyst 27 is so high that the ratio of contribution to the adsorption by the catalyst 27 or the catalytic reaction lowers. For the same value of the deviation ΔA/F between the output value (or the actual air/fuel ratio) of the upstream air/fuel sensor 28 and the target air/fuel ratio, therefore, the air/fuel ratio downstream of the catalyst becomes different for the small and large quantities Q of air flowing into the cylinder. Intrinsically, the calculated results of the catalyst deterioration index should have the same value if the catalysts are deteriorated to the same degree. For INamount≧kamax, therefore, the result is not reflected upon the catalyst deterioration index.

If the value INamount is within the predetermined w range (kamin<INamount<kamax), on the other hand, the routine proceeds to Step 413, at which it is determined either at whether or not the fuel is being cut (F/C) or whether or not the predetermined time kfcret has been elapsed after the return from the fuel cut (F/C). During the fuel cut, no fuel is fed so that the air/fuel ratio in the exhaust gas becomes so lean as to exceed the range in which the air/fuel ratio can be correctly measured by the upstream air/fuel sensor 28. Moreover, till the predetermined time kfcret necessary for the air/fuel ratio feedback control to become stable passes after the return from the fuel cut, that is, till the output value of the upstream air/fuel sensor 28 crosses the target air/fuel ratio, this air/fuel ratio cannot be accurately detected. Hence, during the fuel cut or before the elapse of predetermined time kfcret after the return from the fuel cut, the result is not reflected upon the catalyst deterioration index.

In this case, whether or not the air/fuel ratio feedback is stable is determined from whether or not the predetermined time kfcret has been elapsed from the return from the fuel cut. Alternatively, whether or not the air/fuel ratio feedback is stable may be determined from whether or not the output of the upstream air/fuel sensor 28 has crossed the target air/fuel ratio after the return from the fuel cut, and the catalyst deterioration determining calculation may be inhibited till the output of the upstream air/fuel sensor 28 crosses at first the target air/fuel ratio after the return from the fuel cut. By this modification, too, the catalyst deterioration determining calculation can be started after the air/fuel ratio feedback is stabilized after the return from the fuel cut.

Only if all the conditions are satisfied by the operations of the foregoing Steps 411 to 413: (i) klmin<A/Floc<klmax; (ii) kamin<INamount<kamax; and (iii) not during the fuel cut or after the lapse of the predetermined time kfcret after the return from the fuel cut, that is, only if the air/fuel ratio can be correctly detected, the routine proceeds to Step 414 so as to reflect the (integrated) amount of gas flowing into and out of the catalyst for the predetermined time kdly upon the catalyst deterioration determination. At Step 414, there are integrated from the following equations the amount GASin of gas component flowing into the catalyst and the amount GASout of gas component flowing out of the catalyst, as calculated at the foregoing Steps 406 and 407:

$$TGASin(n)=TGASin(n-1)+GASin(n);$$

and $$TGASout(n)=TGASout(n-1)+GASout(n).$$

Here:
TGASin(n):
the integrated value of the quantities GASin of gas component flowing into the catalyst till this time;
TGASin(n−1):
the integrated value of the quantities GASin of gas component flowing into the catalyst till the previous time;
TGASout(n):
the integrated value of the quantities GASout of gas component flowing out of the catalyst till this time; and
TGASout(n−1):
the integrated value of the quantities GASout of gas component flowing out of the catalyst till the previous time.

After this, the routine proceeds to Step 415, at which the catalyst deterioration determining counter for counting the number of times to be reflected upon the catalyst deterioration determination is incremented. At next Step 416, the time counter 1 for measuring the predetermined time kdly, and the amount GASin of gas component flowing into the catalyst and the amount GASout of gas component flowing out of the catalyst are all set to 0, and the routine proceeds to Step 417. If any of the aforementioned Steps 411 to 413 is determined "No", the routine skips the operations of Steps 416 to 416 to Step 417.

Figure 20:
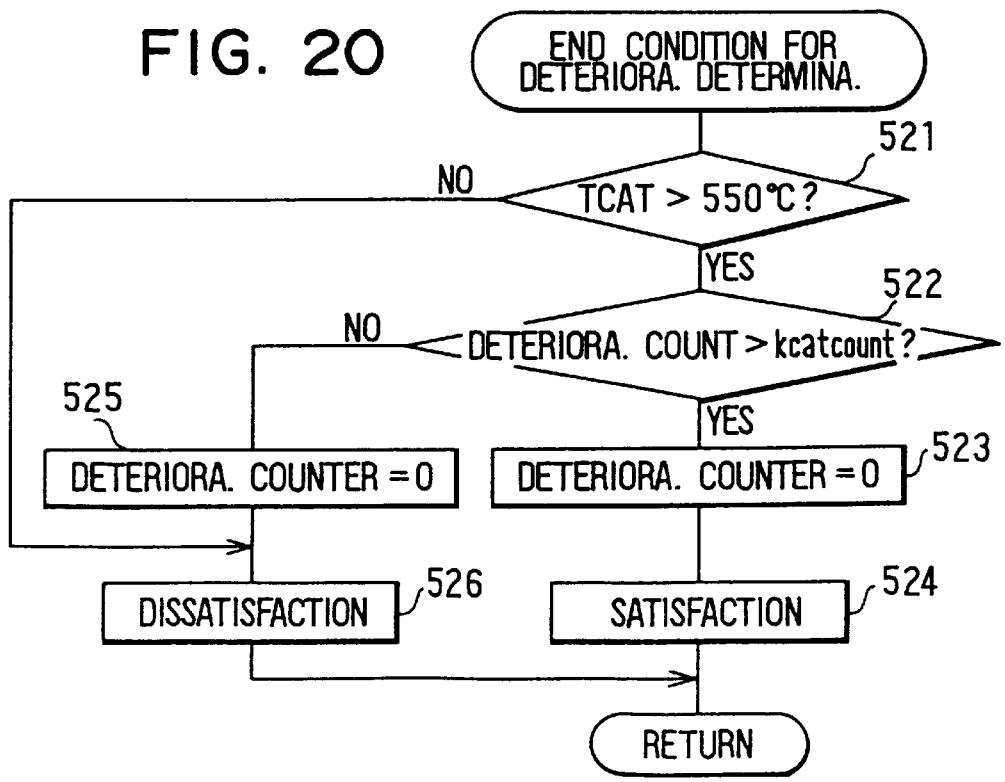
FIG. 20 is a flow chart showing a processing flow a catalyst deterioration determining calculation ending condition determining routine.

At this Step 417, it is determined whether or not the catalyst deterioration determining calculation ending condition is satisfied. Here, whether or not this catalyst deterioration determining calculation ending condition is satisfied is determined in the following procedure by the catalyst deterioration determining calculating ending condition determining routine, as shown in FIG. 20. First of all, at Step 521, it is determined whether or not the catalyst temperature TCAT exceeds a predetermined level (e.g., 550° C.). If this answer is "No", the routine proceeds to Step 526, at which it is determined that the catalyst deterioration determining calculation ending condition is dissatisfied.

At the instant when the catalyst temperature TCAT exceeds the predetermined level (e.g., 550° C.), the routine proceeds from Step 521 to Step 522, at which it is determined whether or not the catalyst deterioration determining counter for counting the number of times to be reflected upon the catalyst deterioration determination exceeds a predetermined value kcatcount. If this answer is "No", the routine proceeds to Step 525, at which the catalyst deterioration determining counter is cleared, and further to Step 526, at which it is determined that the catalyst deterioration determining calculation ending condition is dissatisfied.

At the instant when the catalyst deterioration determining counter exceeds the predetermined value kcatcount, the routine proceeds from Step 522 to Step 523, at which the catalyst deterioration determining counter is cleared, and further to Step 524, at which it is determined that the catalyst deterioration determining calculation ending condition is satisfied.

Thus, whether or not the catalyst deterioration determining calculation ending condition is satisfied is determined by the catalyst deterioration determining calculation ending condition determining routine of FIG. 20. If this answer is "No", the catalyst deterioration detecting routine is ended without executing the catalyst deterioration detecting operations at and after Step 418 of FIG. 17.

If the catalyst deterioration determining calculation ending condition is satisfied, the routine proceeds to Step 418, at which a catalyst deterioration index JUDGE is calculated from the following Equation by using both the integrated value TGASin of the quantities of gas component flowing into the catalyst and the integrated value TGASout of the quantities of gas component flowing out of the catalyst, as calculated at the foregoing Step 414:

$$JUDGE=TGASout/TGASin.$$

This catalyst deterioration index JUDGE is the ratio of the integrated value TGASout of the quantities of gas component flowing out of the catalyst to the integrated value TGASin of the quantities of gas component flowing into the catalyst, as can contribute to the catalytic reaction at a catalyst temperature of 150 to 550° C., and this ratio corresponds to the ratio (i.e., the unpurification factor), as having failed to be purified by the catalyst 27.

At the next Step 419, therefore, the catalyst deterioration index JUDGE is compared with a predetermined deterioration determination value kjudge. If JUDGE>kjudge, it is determined (at Step 420) that the catalyst is deteriorated. If JUDGE≦kjudge, it is determined (at Step 421) that the catalyst is normal (or is not deteriorated). These operations of Steps 418 to 420 operates as catalyst deterioration detecting means.

Fifth Embodiment

Figure 23:
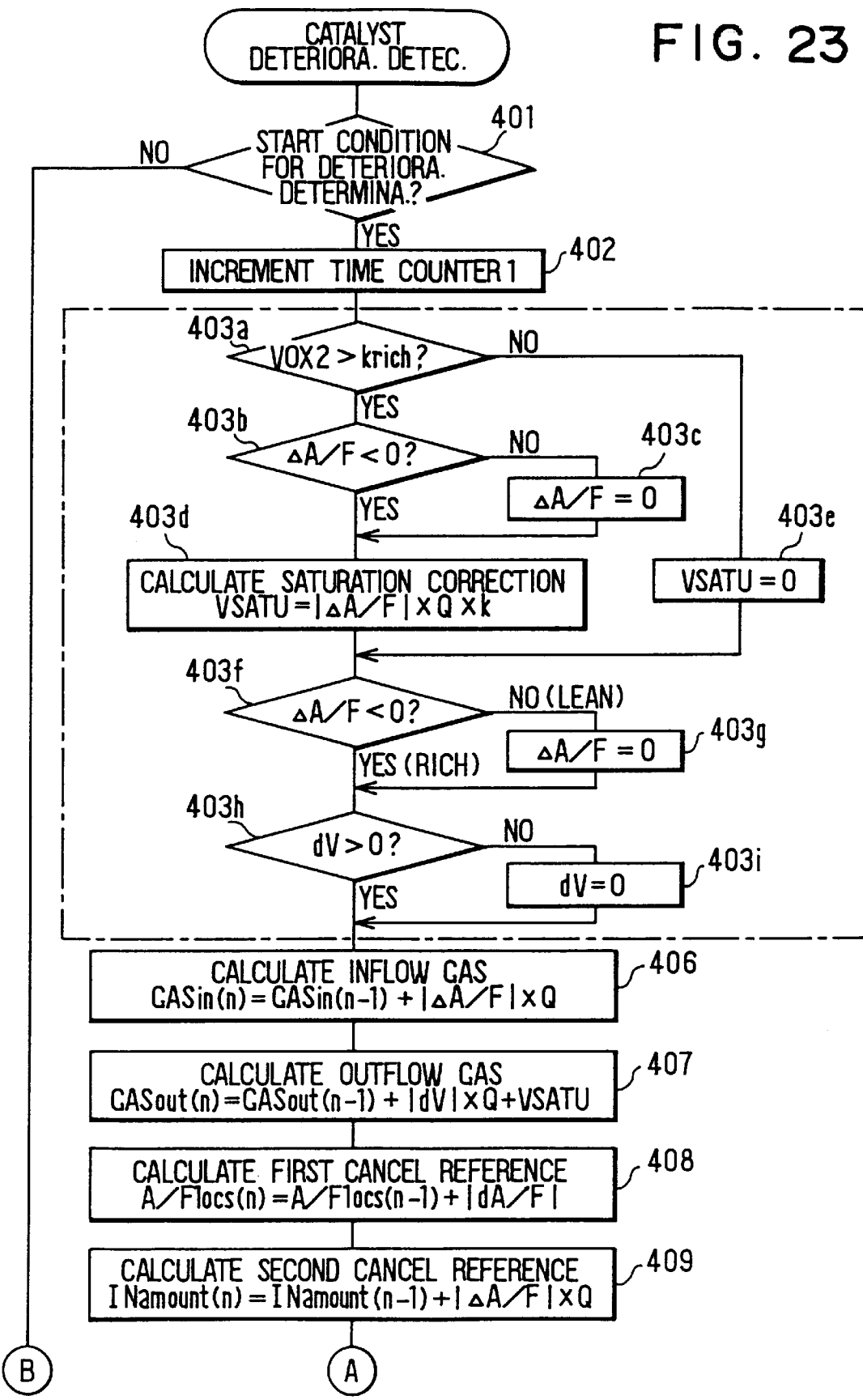
FIG. 23 is a flow chart showing a processing flow of a first half of a catalyst deterioration detecting routine in a fifth embodiment of the present invention.
Figure 24:
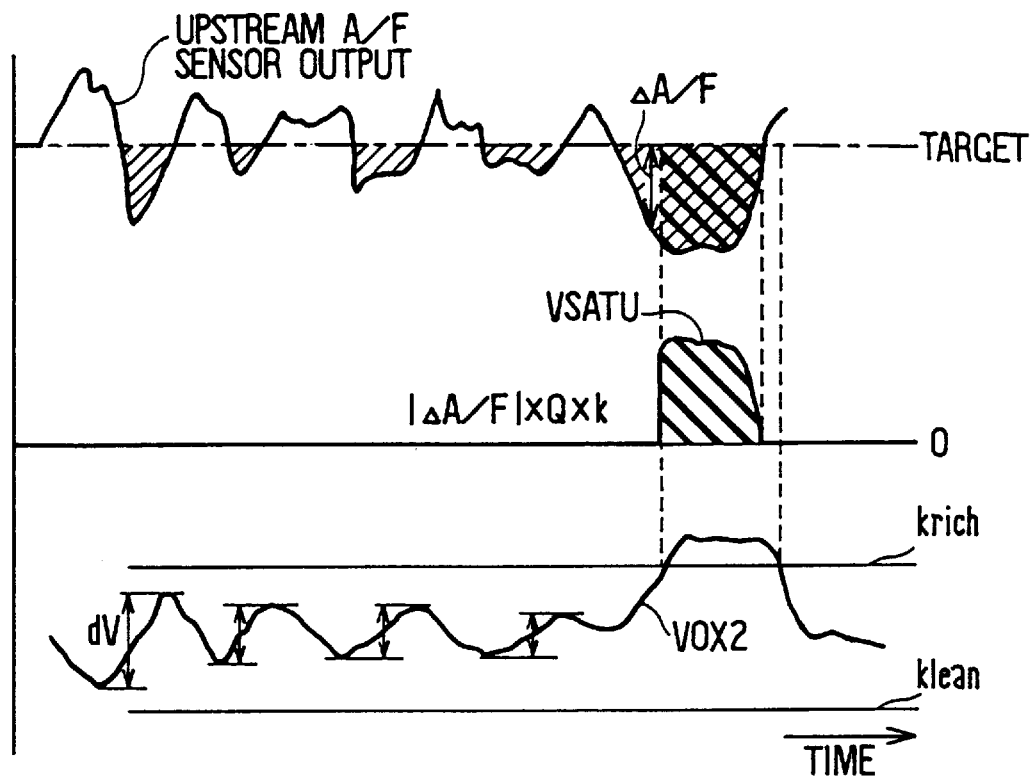
FIG. 24 is a time chart for explaining the relations among the output value of an upstream oxygen sensor, a catalyst saturation correction value VSATU, and the output value of a downstream oxygen sensor in the fifth embodiment of the present invention.

This fifth embodiment, as shown in FIGS. 23 and 24, is modified only partly from the aforementioned fourth embodiment. In this fifth embodiment, the integrated value TGASout of the quantities of gas component flowing out of the catalyst and the integrated value TGASin of gas component flowing into the catalyst 27 are calculated by adding up both the rich fuel components (i.e., the reducing components such as HC, CO or $H_2$) and the lean fuel components (i.e., the oxidizing components such as NOx or $O_2$), as can contribute the catalytic reaction. Despite this embodiment, however, the integrated value TGASout of the quantities of gas component flowing out of the catalyst 27 and the integrated value TGASin of the quantities gas component flowing into the catalyst may be determined by integrating only either of the rich components or the lean components to execute the catalyst deterioration determination.

In this fifth embodiment, in order to determine the degree of deterioration of the HC purification factor of the catalyst 27, only the rich components are integrated to determine the integrated value TGASout of the quantities of rich gas component flowing out of the catalyst and the integrated value TGASin of the quantities of rich gas component flowing into the catalyst to determine the catalyst deterioration.

This catalyst deterioration determination is executed by the catalyst deterioration detecting routine, as shown in FIG. 23. What is different from the processing of the catalyst deterioration detecting routine, as shown in FIGS. 16 and 17, of the foregoing fourth embodiment resides in the operations of Steps 403a to 403i, as enclosed by single-dotted lines in FIG. 23, whereas the remaining operations are identical to those of the foregoing fourth embodiment.

In the catalyst deterioration detecting routine, as shown in FIG. 23, the time counter 1 is incremented (at Step 402), when the catalyst deterioration determining calculation starting condition is satisfied at Step 401. At subsequent Step 403a, the catalyst saturation at the rich side is determined from whether or not VOX2>krich. In the aforementioned fourth embodiment, the catalyst saturations at both the rich side and the lean side are determined. In this fifth embodiment, on the contrary, the catalyst saturation is determined only at the rich side so as to integrate only the rich components. If the catalyst is unsaturated (VOX2≦krich), the routine proceeds to Step 403e, at which the catalyst saturation correction VSATU is set to 0, and the it routine proceeds to Step 304f.

If the catalyst is saturated (VOX2>krich), on the contrary, the routine proceeds to Step 403b, at which it is determined whether or not the deviation ΔA/F (=the target air/fuel ratio–the output value of the upstream air/fuel sensor 28) between the target air/fuel ratio and the output value (i.e., the actual air/fuel ratio) of the upstream air/fuel sensor 28 is negative, i.e., richer than the target air/fuel ratio. If ΔA/F≧0 (lean), the routine proceeds to Step 403c, at which ΔA/F=0 so that the value ΔA/F is not reflected upon the calculation of the amount GASin of gas component flowing into the catalyst. As a result, only if αA/F<0, this value ΔA/F is reflected upon the calculation of the amount GASin of gas component flowing into the catalyst. These Steps 403b and 403c operate as first cancel means.

At the next Step 403d, moreover, the amount (i.e., the catalyst saturation correction) VSATU of gas component flowing out of the catalyst, as cannot be detected from the output change of the downstream oxygen sensor 29, is calculated from the following Equation:

$$VSATU = |\Delta A/F| \times Q \times k.$$

Here, Q designates the flow rate of air flowing into the cylinder, and k designates a conversion coefficient between the output value of the upstream air/fuel sensor 28 and the output value of the downstream oxygen sensor 29. If ΔA/F≧0 (lean), Δ A/F=0 is set at Step 403c so that the catalyst saturation correction VSATU is set to 0. As a result, only if ΔA/F<0 (rich), the catalyst saturation correction VSATU≠0.

One example of the catalyst saturation correction VSATU thus set is illustrated in FIG. 24. As apparent from FIG. 24, the condition for the catalyst saturation correction VSATU≠0 is satisfied only for VOX2>krich and ΔA/F<0. If this condition is dissatisfied, the catalyst saturation correction VSATU is set to 0.

After the catalyst saturation correction VSATU is set at the aforementioned Step 403d or 403e, the routine proceeds to Step 403f, at which it is determined again whether or not ΔA/F<0 (rich). If ΔA/F≧0 (lean), the routine proceeds to Step 403g, at which ΔA/F=0, and further to Step 403h. If ΔA/F<0 (rich), the routine proceeds as it is to Step 403h. At this Step 403h, it is determined whether or not the change dV in the output voltage of the downstream oxygen sensor 29 is positive, that is, whether or not the gas flowing out of the catalyst has changed in the rich direction. If dV≦0 (i.e., changed in the lean direction), the routine proceeds to Step 403i, at which dV=0 is set, so that the change dV is not reflected upon the calculation of the amount of gas component flowing out of the catalyst. This change dV is reflected upon the calculation of the amount GASout of gas component flowing out of the catalyst only if dV>0 (i.e., changed in the rich direction). These Steps 403h and 403i operate as second cancel means.

After the operations thus far described, the routine proceeds to Step 406. The operations on and after this Step 406 are identical to those of the aforementioned fourth embodiment of FIG. 16. At the end of the processing of FIG. 23, therefore, the processing of FIG. 17 is executed. In this fifth embodiment, too, there are executed the catalyst deterioration determining calculation starting condition determining routine of FIG. 18 (or FIG. 19) and the catalyst deterioration determining calculating ending condition determining routine of FIG. 20, as employed in the aforementioned fourth embodiment. If, moreover, the present invention is applied to the system which is equipped with the timer for measuring the time which is elapsed after the engine stop, the catalyst temperature at the engine start is estimated by the catalyst temperature estimating routine of FIG. 13.

In this fifth embodiment, the catalyst deterioration is determined from the unpurification factor (i.e., the catalyst deterioration index JUDGE=TGASout/TGASin) of the rich gas component by integrating only the rich ones of the gas component, as can contribute to the catalytic reaction, and by determining the integrated value TGASout of the quantities of rich gas component flowing out of the catalyst and the integrated value TGASin of the quantities of rich gas component flowing into the catalyst. This makes it possible to determine the degree of deterioration of the HC purification factor of the catalyst 27.

In this fifth embodiment, only the rich components are integrated. On the contrary, only the lean components may be integrated to determine the catalyst deterioration from the unpurification factor of the lean gas components.

Sixth Embodiment

As the catalyst 27 is the more deteriorated, there grows the higher the frequency for the output value VOX2 of the downstream oxygen sensor 29 to deviate from the stoichiometric ratio. Apart from this stoichiometric ratio, the amount of gas component flowing out of the catalyst cannot be detected in terms of the change in the output of the downstream oxygen sensor 29. In the aforementioned fourth and fifth embodiments, therefore, it is determined by determining the catalyst saturation at Step 403 of FIG. 16 and at Step 403a of FIG. 23 whether or not the output valve VOX2 of the downstream oxygen sensor 29 goes out of the stoichiometric ratio. If out of the stoichiometric ratio, the calculation accuracy of the amount GASout of gas component flowing out of the catalyst is improved by calculating the catalyst saturation correction VSATU in accordance with the deviation between the output of the upstream air/fuel ratio sensor 28 and the target air/fuel ratio and by correcting the amount GASout of gas component flowing out of the catalyst with the catalyst saturation correction VSATU. Thus, the catalyst deterioration can be detected even after the complete activation of the catalyst, in which the difference in the HC purification factor is little between the new catalyst and the deteriorated catalyst.

Figure 25:
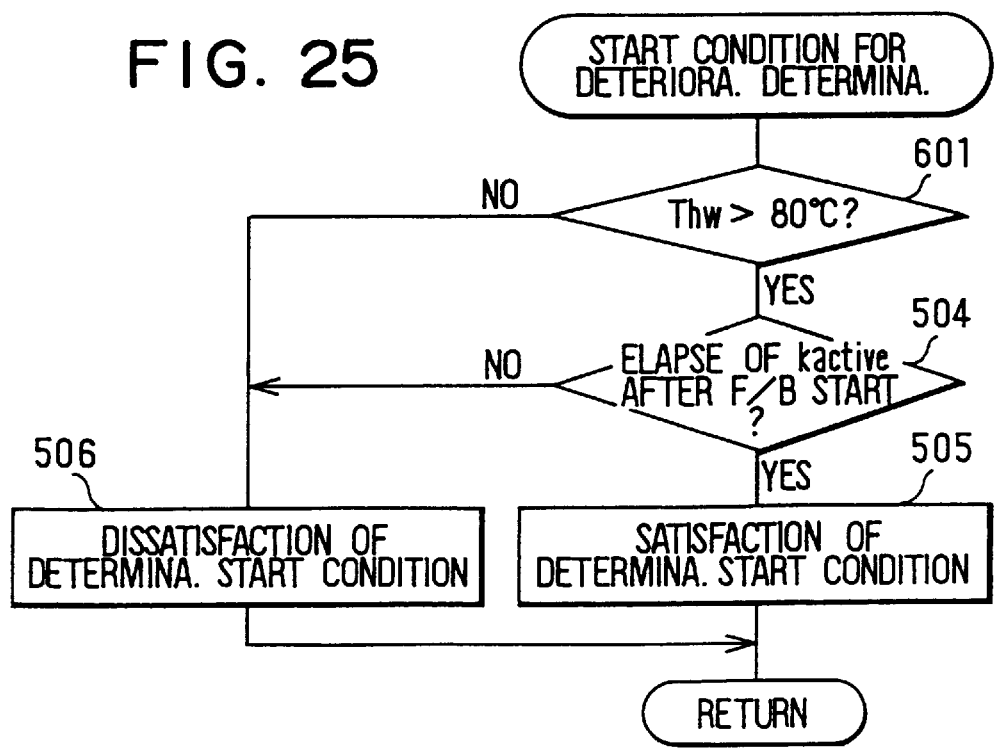
FIG. 25 is a flow chart showing a processing flow of a catalyst deterioration determining calculation starting condition determining routine in a sixth embodiment of the present invention.
Figure 26:
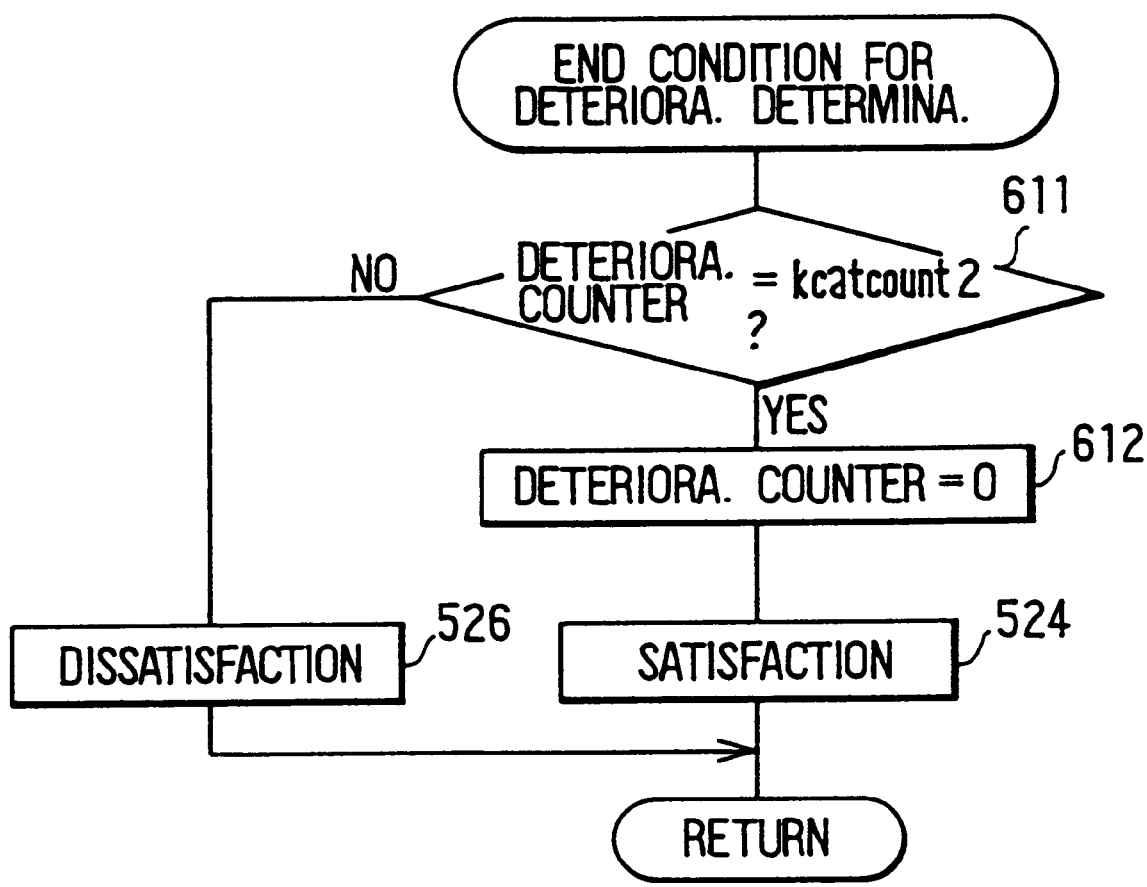
FIG. 26 is a flow chart showing a processing flow of a catalyst deterioration determining calculation ending condition determining routine.

In this sixth embodiment shown in FIGS. 25 and 26, therefore, the catalyst deterioration is determined after the catalyst 27 is completely activated, by determining the staring/ending conditions for the catalyst deterioration determining calculation from the condition determining routines. These processings will be described in the following.

In the catalyst deterioration determining calculation starting condition determining routine shown in FIG. 25, at first Step 601, whether or not the catalyst 27 has been completely activated is determined from whether or not the cooling water temperature Thw exceeds the level (e.g., 80° C.) at the complete end of the engine warm-up. If this answer is "Yes", the routine proceeds to Step 504, at which it is determined whether or not the predetermined time kactive is elapsed after the upstream air/fuel sensor 28 is completely activated (that is, after the air/fuel ratio feedback is started). If this answer is "Yes", the routine proceeds to Step 505, at which it is determined that the catalyst deterioration determining calculation starting condition is satisfied. Here will be described the reason why the elapse of the predetermined time kactive after the complete activation is required. Even if the water temperature is high (that is, the upstream air/fuel ratio sensor 28 is completely activated) at a restart, the catalyst deterioration determining calculation is prevented from being started with the air/fuel ratio feedback being unstable.

In this case, whether or not the air/fuel ratio feedback is stable is determined from whether or not the predetermined time kactive has been elapsed after the complete activation of the upstream air/fuel ratio sensor 28 (or after the start of the air/fuel ratio feedback). Alternatively, whether or not the air/fuel ratio feedback is stabilized may be determined from whether or not the output of the upstream air/fuel ratio sensor 28 has crossed the target air/fuel ratio after the start of the air/fuel ratio feedback, so that the catalyst deterioration determining calculation may be inhibited till the output of the upstream air/fuel ratio sensor 28 crosses at first the target air/fuel ratio after the air/fuel ratio feedback is started.

If the catalyst deterioration determining calculation starting condition is satisfied by the operations of Steps 601 and 504 to 506 thus far described, the operations at and after Step 402 of the catalyst deterioration detecting routine of FIG. 16 or 23 is executed.

If the answer of either Step 601 or 504 is determined "No", on the contrary, the routine proceeds to Step 506, at which it is determined that the catalyst deterioration determining calculation starting condition is dissatisfied to inhibit the catalyst deterioration determining calculation. In the catalyst deterioration determining calculation ending condition determining routine shown in FIG. 26 which is similar to FIG. 20, on the other hand, it is determined at first Step 611 whether or not the catalyst deterioration determining counter for counting the number of times of reflecting the catalyst deterioration determination reaches a predetermined value kcatcount2. If this answer is "No", the routine advances to Step 526, at which it is determined that the catalyst deterioration determining calculating ending condition is dissatisfied.

At the instant, moreover, when the catalyst deterioration determining counter reaches the predetermined value kcatcount2, the routine proceeds from Step 611 to Step 612, at which the catalyst deterioration determining counter is cleared, and the routine proceeds to Step 524, at which it is determined that the catalyst deterioration determining calculation ending condition is satisfied. If this catalyst deterioration determining calculation ending condition is satisfied, the operations at and after Step 418 of FIG. 17 are executed to calculate the catalyst deterioration index JUDGE (=TGASout/TGASin) and to compare this catalyst deterioration index JUDGE with the deterioration determining value kjudge. If JUDGE>kjudge, it is determined that the catalyst is deteriorated. If JUDGE<kjudge, it is determined that the catalyst is normal (i.e., not deteriorated). the deterioration determining value kjudge is set to a lower value than that of the fourth and fifth embodiments, in which the deterioration is determined in the course of catalyst activation. As a result, the catalyst deterioration can be detected even after the complete catalyst activation in which the difference in the HC purification factor is small between the new catalyst and the deteriorated catalyst.

The present invention may be mofified further without departing from the spirit and scope of the invention.

What is claimed is:

1. An exhaust gas purifying catalyst deterioration detecting system comprising:

calculation means for calculating an amount of exhaust gas component purified in an exhaust gas purifying catalyst disposed in an exhaust system of an internal combustion engine, after a start of said internal combustion engine and before said catalyst reaches a predetermined temperature corresponding to catalyst activation; and catalyst deterioration detecting means for detecting a deterioration of said catalyst based on the amount of purified gas component calculated by said calculation means.

2. An exhaust gas purifying catalyst deterioration detecting system according to claim 1, wherein:

said catalyst deterioration detecting means detects a deterioration of said catalyst further based on a fluctuation of the gas component flowing into said catalyst until said catalyst reaches the predetermined temperature.

3. An exhaust gas purifying catalyst deterioration detecting system according to claim 1, wherein:

said calculation means calculates the amount of purified gas component based on an air/fuel ratio of the exhaust gas downstream of said catalyst.

4. An exhaust gas purifying catalyst deterioration detecting system according to claim 2, wherein:

data of the fluctuation of the gas component flowing out of the catalyst is calculated based on an air/fuel ratio of the exhaust gas flowing into said catalyst and a flow rate of the exhaust gas.

5. An exhaust gas purifying catalyst deterioration detecting system according to claim 4, wherein:

the data of said fluctuation of gas component flowing into the catalyst and the amount of purified gas component are each calculated for a predetermined time period; and the data of said fluctuation of gas component flowing into the catalyst and said amount of purified gas component calculated for said predetermined time period are canceled when the data of said fluctuation of gas component flowing into the catalyst calculated for said predetermined time period is outside a predetermined range.

6. An exhaust gas purifying catalyst deterioration detecting system according to claim 1, wherein:

said catalyst deterioration detecting means includes means for inhibiting the catalyst deterioration detection until a temperature of said catalyst reaches a deterioration detection starting temperature, said deterioration detecting starting temperature being lower than said predetermined temperature.

7. An exhaust gas purifying catalyst deterioration detecting system according to claim 1, wherein:

said catalyst deterioration detecting means includes means for inhibiting the catalyst deterioration detecting when a temperature of said catalyst at the start of said internal combustion engine is higher than a predetermined level.

8. An exhaust gas purifying catalyst deterioration detecting system according to claim 7, wherein:

said catalyst deterioration detecting means determines that the temperature of said catalyst at the start of said internal combustion engine is higher than the predetermined temperature, thereby to inhibit the catalyst deterioration detection, when either a difference between a cooling water temperature and an intake temperature or a difference between said cooling water temperature and an ambient temperature at the start of said internal combustion engine is greater than a predetermined value.

9. An exhaust gas purifying catalyst deterioration detecting system according to claim 1, further comprising:

a catalyst temperature estimating means for estimating an exhaust temperature based on a running state of said internal combustion engine and for estimating a temperature of said catalyst based on the estimated exhaust temperature.

10. An exhaust gas purifying catalyst deterioration detecting system according to claim 9, further comprising:

stop time measuring means for measuring the time elapsed after a stop of said internal combustion engine, wherein said catalyst temperature estimating means includes means for estimating the catalyst temperature at a time of starting said internal combustion engine based on at least one of ambient temperature, intake temperature and cooling water temperature, and an elapsed time after the stop of said internal combustion engine measured by said stop time measuring means.

11. An exhaust gas purifying catalyst deterioration detecting system according to claim 1, further comprising:

an air/fuel ratio sensor disposed upstream of said catalyst so as to effect an air/fuel ratio feedback control based on an output of said air/fuel ratio sensor; and means for inhibiting catalyst deterioration detecting before a predetermined period has elapsed after a start of said air/fuel ratio feedback control.

12. An exhaust gas purifying catalyst deterioration detecting system according to claim 1, wherein:

said catalyst deterioration detecting means determines that the catalyst is deteriorated when the calculated amount of purified exhaust gas component is less than a predetermined deterioration determining reference value.

13. An exhaust gas purifying catalyst deterioration detecting system according to claim 1, wherein:

said calculation means calculates the amount of exhaust gas component purified in said catalyst from the amount of the exhaust gas component flowing into the catalyst and the amount of the exhaust gas component flowing out of said catalyst.

14. An exhaust gas purifying catalyst deterioration detecting system according to claim 3, wherein:

said calculation means calculates the amount of exhaust gas component purified in said catalyst by accumulating changes in the air/fuel ratio detected by an oxygen responsive sensor provided downstream of said catalyst.

15. An exhaust gas purifying catalyst deterioration detecting system according to claim 4, wherein:

the data of said fluctuation of the gas component flowing into said catalyst is calculated by a multiplication of a flow rate of the exhaust gas flowing into said catalyst and an accumulated difference between a target air/fuel ratio and the air/fuel ratio of the exhaust gas detected by an oxygen responsive sensor provided upstream of said catalyst.

16. An exhaust gas purifying catalyst deterioration detecting system according to claim 13, wherein said calculation means calculates the amount of exhaust gas component purified in said catalyst by subtracting data of the fluctuation of the gas component flowing out of the catalyst from data of the fluctuation of the gas component flowing into the catalyst.

17. An exhaust gas purifying catalyst deterioration detecting system according to claim 16, wherein the data of said fluctuation of the gas component flowing into the catalyst is calculated by a multiplication of a flow rate of the exhaust gas flowing into said catalyst and an accumulated difference between a target air/fuel ratio and the air/fuel ratio of the exhaust gas detected by an air/fuel ratio sensor provided upstream of said catalyst.

18. An exhaust gas purifying catalyst deterioration detecting system according to claim 16, wherein said data of said fluctuation of the gas component flowing out of said catalyst is calculated by a multiplication of a flow rate of the exhaust gas flowing into said catalyst and an accumulated difference between a target air/fuel ratio and the air/fuel of the exhaust gas detected by an air/fuel ratio sensor provided downstream of said catalyst.

19. An exhaust gas purifying catalyst deterioration detecting system comprising:

calculation means for calculating the amount of exhaust gas component unpurified in an exhaust gas purifying catalyst disposed in an exhaust system of an internal combustion engine, after a start of said engine and before an activation of said catalyst; and catalyst deterioration detecting means for detecting a deterioration of said catalyst as the calculated amount of the unpurified exhaust gas component increases.

20. An exhaust gas purifying catalyst deterioration detecting system according to claim 19, wherein said catalyst deterioration detecting means determines that the catalyst is deteriorated when the calculated amount of the unpurified exhaust gas component is greater than a predetermined deterioration determination value.

21. An exhaust gas purifying catalyst deterioration detecting system according to claim 19, wherein said calculation means calculates the amount of the unpurified exhaust gas component from outputs of an oxygen responsive sensor provided downstream of said catalyst.

22. An exhaust gas purifying catalyst deterioration detecting system according to claim 19, wherein said calculation means further calculates the amount of the exhaust gas component flowing into said catalyst; and said catalyst deterioration detecting means detects the deterioration of said catalyst from the calculated a mount of exhaust gas component flowing into said catalyst and the calculated amount of unpurified exhaust gas component.

23. An exhaust gas purifying catalyst deterioration detecting system according to claim 19, wherein:

said calculation means further calculates a difference between a target air/fuel ratio and an air/fuel ratio detected upstream of said catalyst, multiples the difference in the air/fuel ratios and the mount of exhaust gas flowing into said catalyst, calculates the amount of exhaust gas component flowing into said catalyst before the activation of said catalyst, and calculates the amount of unpurified gas component based on an air/fuel ratio detected downstream of said catalyst; and said catalyst deterioration detecting means detects the deterioration of said catalyst as the calculated amount of the exhaust gas component flowing into said catalyst decreases and the calculated amount of the unpurified exhaust gas component increases.

* * * * *